United States Patent
Kato

[11] Patent Number: 6,167,087
[45] Date of Patent: Dec. 26, 2000

[54] PICTURE SIGNAL ENCODING METHOD AND APPARATUS AND SIGNAL RECORDING MEDIUM

[75] Inventor: Motoki Kato, Kanagawa, Japan

[73] Assignee: Sony Corporation, Tokyo, Japan

[21] Appl. No.: 08/982,827

[22] Filed: Dec. 2, 1997

[30] Foreign Application Priority Data

Dec. 3, 1996 [JP] Japan .................................. 8-323157

[51] Int. Cl.[7] .................................................. H04N 7/12
[52] U.S. Cl. .................................. 375/240.03; 348/419.1
[58] Field of Search .................................. 348/405, 406, 348/419, 406.1, 419.1, 400.1; 382/251, 252; 375/243, 245, 240.03; 341/200

[56] References Cited

U.S. PATENT DOCUMENTS

| | | | |
|---|---|---|---|
| 4,984,076 | 1/1991 | Watanabe et al. | 348/405 |
| 5,144,424 | 9/1992 | Savatier | 348/405 |
| 5,294,974 | 3/1994 | Naimpally et al. | 348/405 |
| 5,333,012 | 7/1994 | Singhal et al. | 348/405 |
| 5,434,623 | 7/1995 | Coleman et al. | 348/405 |
| 5,585,853 | 12/1996 | Juri et al. | 348/405 |
| 5,621,465 | 4/1997 | Kondo | 348/405 |
| 5,680,483 | 10/1997 | Tranchard | 348/405 |
| 5,721,589 | 2/1998 | Murata | 348/405 |
| 5,751,358 | 5/1998 | Suzuki et al. | 348/405 |
| 5,757,434 | 5/1998 | Klein-Gunnewiek et al. | 348/405 |
| 5,764,296 | 6/1998 | Shin | 348/405 |
| 5,880,785 | 3/1999 | Fujiwara | 348/405 |
| 5,883,672 | 3/1999 | Suzuki et al. | 348/405 |
| 5,926,222 | 7/1999 | Nickerson | 348/419.1 |
| 5,933,194 | 8/1999 | Kim et al. | 348/405 |
| 5,956,426 | 9/1999 | Matsuura et al. | 348/405 |
| 5,959,675 | 9/1999 | Mita et al. | 348/405 |
| 5,990,962 | 11/1999 | Ueno et al. | 348/416 |
| 6,037,986 | 3/2000 | Zhang et al. | 348/409 |

OTHER PUBLICATIONS

ISO/IEC Standard, JTC1/SC29/WG11/N0400 Test Model 5, pp. 54–57, Apr. 1993.

*Primary Examiner*—Vu Le
*Attorney, Agent, or Firm*—Limbach & Limbach L.L.P.; Seong-Kun Oh

[57] ABSTRACT

A picture signal encoding apparatus on which, even if a picture is not uniform in picture pattern, the picture can be rendered substantially uniform in picture quality, the volume of bits occupying a virtual buffer is stabilized, deterioration in picture quality is rendered less visible and in which stable rate control is assured. The picture signal encoding apparatus, dividing a picture making up moving picture signals into plural macro-blocks MB and encoding the signals from one macro-block to another, includes a relative coding difficulty calculating circuit for calculating the relative coding difficulty from one macro-block to another MB, and a characteristic value calculating circuit for calculating the weighting coefficients (characteristic values) specifying visibility degree of picture quality deterioration from one macro-block MB to another. The picture signal encoding apparatus also includes a bit rate controller for calculating the quantization scale for encoding each macro-block MB using the complexity degree and the volume of allocated bits for macro-block-based encoding.

51 Claims, 15 Drawing Sheets

QUANTIZATION MATRIX
FOR INTRA-CODING m1 [u, v] = {
  8, 16, 19, 22, 26, 27, 29, 34,
16, 16, 22, 24, 27, 29, 34, 37,
19, 22, 26, 27, 29, 34, 34, 38,
22, 22, 26, 27, 29, 34, 37, 40,
22, 26, 27, 29, 32, 35, 40, 48,
25, 27, 29, 32, 35, 40, 48, 58,
26, 27, 29, 34, 38, 46, 56, 69,
27, 29, 35, 38, 46, 56, 69, 83 } :

FIG.7A

QUANTIZATION MATRIX
FOR INTER-CODING m2 [u, v] = {
16, 16, 16, 16, 16, 16, 16, 16,
16, 16, 16, 16, 16, 16, 16, 16,
16, 16, 16, 16, 16, 16, 16, 16,
16, 16, 16, 16, 16, 16, 16, 16,
16, 16, 16, 16, 16, 16, 16, 16,
16, 16, 16, 16, 16, 16, 16, 16,
16, 16, 16, 16, 16, 16, 16, 16,
16, 16, 16, 16, 16, 16, 16, 16 } :

FIG.7B

PICTURE SIGNAL ENCODING METHOD AND APPARATUS AND SIGNAL RECORDING MEDIUM

BACKGROUND OF THE INVENTION

1. Field of the Invention

This invention relates to a picture signal encoding method or apparatus used in a system for encoding picture signals for moving pictures for storage on a recording medium, such as an optical disc, a magnetic disc or a magnetic tape or in a system for transmitting picture signals of moving pictures over a transmission route. This invention also relates to a signal recording medium used in these systems.

2. Description of Related Art

In general, digital video signals are extremely large in information volume. Therefore, if it is attempted to record the digital video signals for prolonged time on a small-sized recording medium with a small storage information volume (storage capacity), or to transmit the digital video signals over a transmission channel of limited communication capacity, it is indispensable to encode the digital video signals by high efficiency encoding in order to reduce the information volume. For meeting this demand, there are proposed high efficiency encoding systems exploiting the correlation of video signals. One of these systems is the Moving Picture Exerts Group (MPEG) system, in which the inter-frame difference is taken of video signals to lower redundancy along time axis and subsequently the orthogonal transform technique such as discrete cosine transform (DCT) is used to lower redundancy along the spatial axis for efficiently encoding the video signals.

With the MPEG system, the pictures making up a moving picture are classified into three sorts of pictures, namely I-pictures, P-picture or B-pictures, for compression coding of picture signals, as shown in FIG. 1. The I-picture is an intra-coded picture and is decoded independently of other pictures. The P-picture is a forward predictive coded picture obtained on prediction coding from the temporally backward or past I- or P-pictures. The B-picture is a bi-directional predictive coded picture obtained on predictive coding from forward, backward or bi-directional pictures using a temporally forward or backward I- or P-picture. A set of these pictures constitutes so-called group-of-pictures (GOP).

Each picture is divided into smaller units termed macroblocks. In the case of, for example, a 4:2:0 format digital video, each macro-block MB is made up of six blocks, namely four luminance blocks (Y) and two spatially associated chrominance blocks Cb and Cr. Each of these blocks is made up of 8 by 8 pixels, totaling at 64 pixels.

If the number of pixels in the horizontal direction of the luminance signals is PH, the number MBH of the macro-blocks of a picture in the horizontal direction is given by the following equation (1):

$$MBH=(PH+15)/16 \qquad (1)$$

On the other hand, if the number of pixels in the vertical direction of the luminance signals is PV, the number MBV in the vertical direction of a picture of an interlaced frame (with a flag defined by MPEG2 progressive_sequence=0) is given by the following equation (2):

$$MBV=2*((PV+31)/32) \qquad (2)$$

The number NMB in a picture is found from the following equation (3):

$$NMB=MBH*MBV \qquad (3)$$

FIG. 2 shows the coding sequence of each macro-block MB in an I-picture. That is, the macro-blocks MB in the I-picture are encoded sequentially (in the order specified by numerical figures entered in FIG. 2) beginning from the first or upper left macro-block up to the NMBth macro-block MB, as shown in FIG. 2.

In the MPEG coding system, the numbers of allocated bits are preferably varied adaptively from picture to picture for taking advantage of the performance of the three sorts of pictures (I- P- or B-pictures) of different properties. Also, in the MPEG coding system, the quantization scale for quantization of DCT coefficients of a macro-block MB can be varied from one macro-block MB to another for performing bit rate control so that the volume of generated bits of a coded picture will approach a designated amount of allocated bits.

Among widely known systems for controlling the quantization scale of a macro-block MB is a system disclosed in ISO/IEC JTC1/SC29/WG11/N0400 test Model 5, pp. 54 to 57 (April 1993). The corresponding technical information is afforded by, for example, U.S. Pat. No. 5,144,424 entitled APPARATUS FOR VIDEO DATA QUANTIZATION CONTROL. The control system for controlling the quantization scale of this macro-block MB is hereinafter termed TM5 rate control.

FIG. 3 shows a flowchart for this TM5 rate control.

In FIG. 3, assume that the number of pictures in a video sequence is NPICT and a variable specifying a picture for calculating the volume of allocated bits among the pictures of the sequence is pict_i. That is, the flowchart of FIG. 3 shows the flow for calculation of the volume of allocated bits for the pict-ith one of the pictures in the sequence. The volume of allocated bits for the pict_ith picture is BT. In the following explanation, each variable is described by the C++ language as one of programming languages.

First, at step ST51, the variable pict_i is set to 1 as a picture for calculating the volume of allocated bits for specifying the first picture in the sequence.

After this step ST51, the above variable pict_i is sequentially incremented by 1 in the processing from step ST52 to step ST63 for calculating the volume of allocated bits in each picture in the sequence. The processing from step ST51 up to step ST64 is repeated until the calculations of the volume of allocated bits come to a close for all pictures in the sequence.

For this processing from step ST52 up to step ST63, the volume of allocated bits BT for the pict_ith picture is first calculated at step ST52. First, parameters specifying picture complexity degree are calculated from one picture type to another, and the volume of allocated bits of the GOP is allotted by proportionate distribution to each picture depending on the picture complexity degree.

At the steps ST53 and ST54 to ST60, the quantization scale of each macro-block in the pict_ith picture is calculated. Here, the variable specifying the macro-block MB in which the quantization scale is calculated in the pict_ith picture is set as mb_i.

At step ST53, of the above steps ST53 up to ST60, the above variable mb_i as the macro-block MB in the pict_ith picture, in which to execute the calculations for the quantization scale, is set to 1 for designating the first macro-block in the picture.

After this step ST53, the above variable mb_i is sequentially incremented by 1 in the processing from step ST54 up to step ST60, for calculating the quantization scale in each macro-block MB in the picture. The processing from ST54 to step ST60 is repeated until the calculations of the quantization scale for all macro-blocks MB in the picture come to a close.

As the processing from ST54 to step ST60, the total volume of the quantization scale in a picture under consideration is calculated, from the volume of bits occupying the virtual buffer, in accordance with the following equation (4):

$$GQ = d[mb\_i] * 31/r \qquad (4)$$

where GQ is the global quantization scale.

In the above equation, d[mb_i] is the volume of bits occupying the virtual buffer prior to coding of the mb_ith macro-block MB, and r (termed a reaction parameter) is of a constant value pertinent to the target bit rate and the picture rate. The larger the volume of bits occupying the virtual buffer, the larger is the above global quantization scale GQ. Meanwhile, the calculations of the volume of bits occupying the virtual buffer will be explained subsequently in connection with the step ST58.

Next, at step ST55, a weighting coefficient W taking into account the visual characteristics of the mb_ith macro-block MB is calculated from the following equation (5):

$$W = (act[mb\_i] + 2*avg\_act)/(2*act[mb\_i] + avg\_act) \qquad (5)$$

In the equation (5), act[mb_i is a minimum value of the variance of four luminance signal blocks of the macro-block MB. This value specifies picture pattern complexity degree of the luminance signals. The larger this value, the more complex is the picture pattern. In the above equation, avg_act is a mean value of act[mb_i]. In a flat portion where deterioration is perceptually acute, the weighting coefficient becomes larger. Conversely, in a picture portion with complex picture patterns, where deterioration is perceptually less acute, the weighting coefficient W becomes smaller. The weighting coefficient W is normalized so that its value ranges from ½ to 2 and an expected value of W in the I-picture will be equal to 1.

At the next step ST56, the quantization scale mQ of the mb_ith macro-block MB is calculated in accordance with the following equation (6):

$$mQ = GQ/W \qquad (6)$$

At the next step ST57, the DCT coefficients of the mb_ith macro-block MB are quantized and encoded for thereby calculating the volume of actually generated bits bit_mb[mb_i] of the mb_ith macro-block MB.

At the next step ST58, the volume of bits occupying the virtual buffer is updated. dI, dP and dB are provided for the I-, P- and B-picture, respectively, and are updated in accordance with the following equations (7) to (9):

$$dI[mb\_i+1] = dI[1] + BG[mb\_i] \cdot BT*mb\_i/NMB \qquad (7)$$

$$dP[mb\_i+1] = dP[1] + BG[mb\_i] \cdot BT*mb\_i/NMB \qquad (8)$$

$$dB[mb\_i+1] = dB[1] + BG[mb\_i] \cdot BT*mb\_i/NMB \qquad (9)$$

In the above equations, dI[1], dP[1] and dB[1] denote the volume of bits initially occupying each virtual buffer and BG[mb_i] denotes the sum of generated encoding bits bit_mb from the first macro-block MB up to the mb_ith macro-block MB of the picture, as shown in the following equation (10):

$$BG[mb\_i] = \Sigma bit\_mb[mb\_i] \; (i = 1 \sim mb\_i) \qquad (10)$$

In each of the above equations, (BT*mb_i/NMB) denotes a value obtained on allocating the volume of bits BT allocated to a given picture to mb_i macro-blocks MB among the total number of macro-blocks NMB of the picture.

At step ST59, the address of the macro-block MB is advanced by one. That is, the above variable mb_i is incremented.

At the next step ST60, it is judged whether or not processing of the last macro-block of the pict_ith picture has come to a close, that is whether or not the variable mb_i is larger than the number of macro-blocks NMB in the picture. If the result is negative, that is if processing is not terminated, processing reverts to step ST54. If the result is affirmative, that is if processing has been terminated, processing transfers to the next step ST61.

At this step ST61, the variable pict_i is incremented by 1 before proceeding to processing the next picture.

At step ST62, the volume of bits occupying the virtual buffers dI[NMB+1], dP[NMB+1] and dB[NMB+1] at the time of end of the above-described picture encoding are substituted for the volume of bits occupying the virtual buffers dI[1], dP[1] and dB[1]. That is, the initial volumes of the occupying bits of the virtual buffers are updated as shown by the equations (11) to (13):

$$dI[1] = dI[NMB+1] \qquad (11)$$

$$dP[1] = dP[NMB+1] \qquad (12)$$

$$dB[1] = dB[NMB+1] \qquad (13)$$

At the next step ST63, it is judged whether or not processing of the last picture of the sequence (with the number of pictures of NPICT) has come to a close. Specifically, it is judged whether or not the variable pict_i is larger than the number of pictures NPICT of the sequence. If the result of judgment is negative, that is if processing has not come to a close, processing reverts to step ST52 and, if otherwise, that is if processing has come to a close, processing of TM5 rate control comes to a close.

Meanwhile, when calculating the quantization scale of the current macro-block MB in the above TM5 rate control, the quantization scale GQ is calculated from the current volume of bits occupying the virtual buffer as shown by the above equation (4). The global quantization scale GQ is calculated for stabilizing the volume of bits occupying the virtual buffer calculated by the above equations (7) to (9). That is, feedback is applied such that, if the volume of generated bits of the pictures up to now BG is smaller than the volume of bits allocated up to now (BT*mb_i/NMB) such that the volume of bits occupying the virtual buffer is decreased (that is decreased in value), the global quantization scale GQ is diminished from the equation (4) whereby the volume of generated bits of the macro-block MB is increased to stabilize the volume of bits occupying the virtual buffers. If reverse is the case, that is if the volume of bits occupying the virtual buffer is increased in its value, there is applied such feedback that the global quantization scale GQ is increased to diminish the volume of generated bits of the macro-block MB to stabilize the volume of bits occupying the virtual buffers. This feedback control assures uniform volume of bits generated in the pictures.

However, this control raises a problem if the picture is not uniform in pattern, for example, if the picture contents differ in the upper and lower halves, such that the upper half is of a simple picture pattern whereas the lower half is complex in picture pattern. That is, since feedback is applied such that the volume of generated bits in the upper half will be equal to that in the lower half, the upper half picture is quantized finely, while the lower picture half is quantized roughly, with the result that the picture quality is not uniform. There is also raised a problem that when the macro-block MB transfers from the upper half picture to the lower half picture, the volume of bits occupying the virtual buffers tends to be non-stable.

Moreover, in the above TM5 rate control, the weighting coefficients taking into account the visual characteristics of the macro-blocks MB are calculated from the flatness of the luminance signals. This, however, is insufficient if desired to render deterioration in picture quality less acute.

In addition, in the TM5 rate control, stable rate control is not assured if the weighting coefficients W are not normalized so that the expected value in the I-picture of the weighting coefficients W taking into account the visual characteristics will be equal to 1. For example, assume that the quantization scale mQ indicated by numerical figures in FIG. 4 has been calculated in each macro-block MB, wherein smaller and larger values of the numerical figures stand for fine quantization and rough quantization, respectively. Also assume that, in this case, it is desired to reduce the quantization scale of the macro-blocks shown shaded in FIG. 4A, and the weighting coefficients only of the macro-blocks shown shaded in FIG. 4A are increased. Since the expected value of the weighting coefficients ceases to be equal to 1, only the quantization scale calculated for the macro-blocks following the macro-blocks shown shaded in FIG. 4B is increased.

In the TM5 rate control, since the weighting coefficients W for flatness of the macro-blocks MB are normalized relative to an average value of the flatness of the I-picture in calculations, the expected value of the weighting coefficients W is 1. However, if the weighting coefficients W are absolutely designated for the parameters taking into account visual characteristics of the macro-block MB, such that the expected value of the weighting coefficients W ceases to be 1, stable rate control is not assured.

SUMMARY OF THE INVENTION

It is therefore an object of the present invention to provide a picture signal encoding method and apparatus and a signal recording medium in which a picture having non-uniform pattern can be rendered substantially constant in picture quality, the volume of bits occupying a virtual buffer can be stabilized, picture quality deterioration can be rendered less acute and in which the stable rate control is assured.

In one aspect, the present invention provides a method for encoding picture signals in which moving picture signals are divided into plural domains for encoding from one domain to another, including calculating relative coding difficulty from domain to domain, calculating weighting coefficients representing the degree of visibility of picture quality deterioration from domain to domain, calculating the complexity degree from domain to domain, based on the relative coding difficulty and the weighting coefficients and calculating the quantization scale for encoding for the domains based on the complexity degree and the allocated bit volumes for encoding the domains.

In calculating the quantization scale, the volume of bits allocated to each domain is calculated in proportion to the complexity degree of each domain relative to complexity of the entire picture. The relative coding difficulty is calculated using the volume of codes generated on encoding each domain with a fixed quantization scale, the volume of predicted remainder signals at the time of detecting the motion vector of each domain or the difference residual volume from a mean value of each domain. The weighting coefficients are calculated based on the combination of at least one of the lightness, redness, amount of motion and the position of each domain in the picture, in addition to the flatness of the luminance signals of the moving picture. The encoded data string of the picture obtained on this encoding is transmitted or recorded.

In another aspect, the present invention provides a recording medium having recorded thereon an encoded data string obtained on calculating, for each of plural domains into which is divided a picture making up moving picture signals, the relative coding difficulty and weighting coefficients representing the visibility degree of picture quality deterioration, calculating the complexity degree from the relative coding difficulty and the weighting coefficients, calculating the quantization scale of encoding for each domain based on the volume of allocated bits for encoding each domain and complexity degree and on encoding each domain based on the quantization scale.

BRIEF DESCRIPTION OF THE DRAWINGS

FIGS. 4A and 4B illustrate typical results of calculations of the quantization scale of the macro-blocks MB of a picture by a conventional method.

FIGS. 7A and 7B illustrate quantization matrices for intra-coding and inter-coding, respectively.

DESCRIPTION OF PREFERRED EMBODIMENTS

Figure 1:
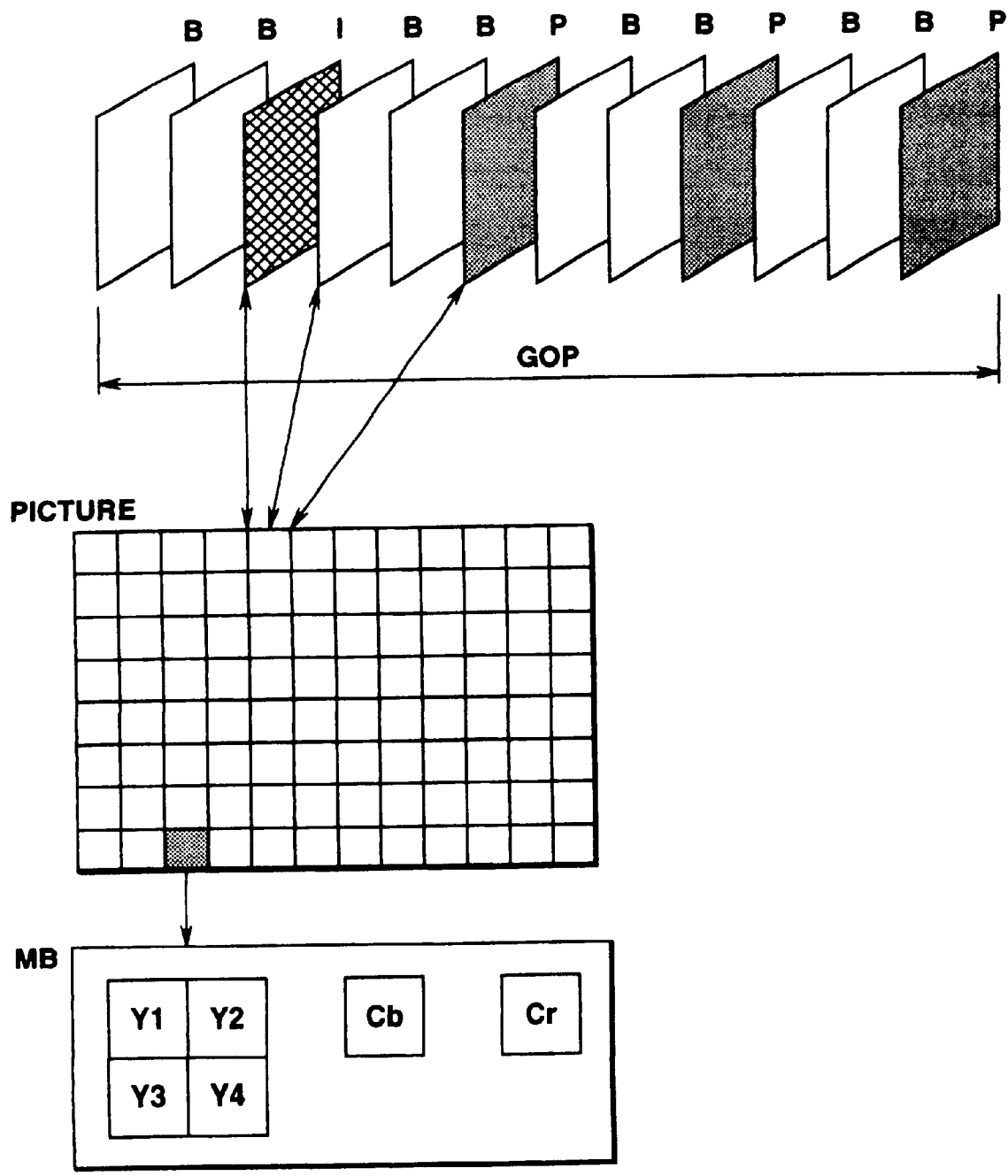
FIG. 1 illustrates typical results of calculations of a MPEG data structure.

Referring to the drawings, preferred embodiments of a picture signals encoding method and apparatus and a signal recording medium according to the present invention will be explained in detail.

Figure 5:
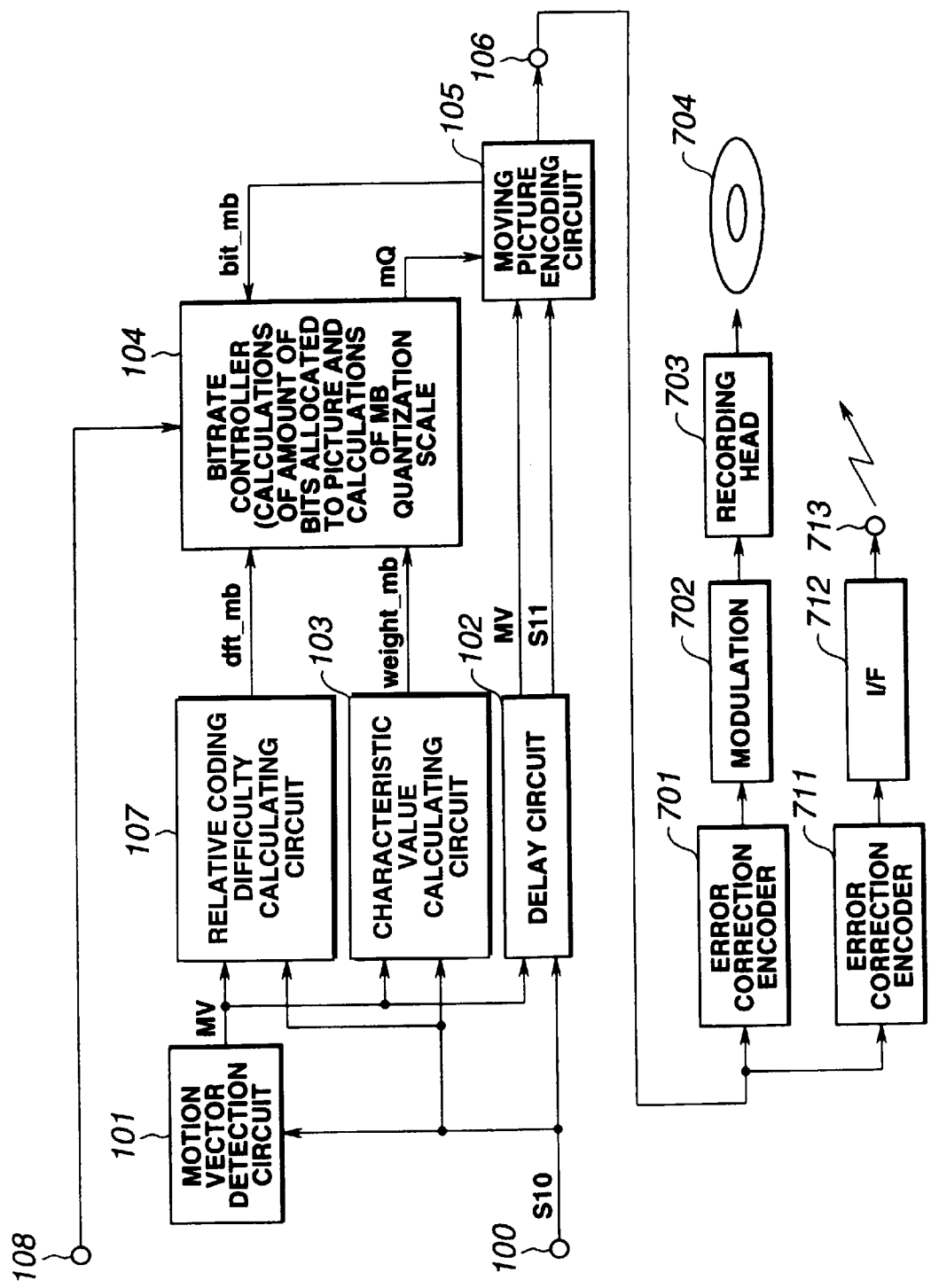
FIG. 5 is a block circuit diagram showing a first embodiment of a picture signal encoding device according to the present invention.

FIG. 5 shows a first embodiment of a picture signal encoding device of the present invention.

In FIG. 5 a digital moving picture signal S10 entering a terminal 100 is sent to a motion vector detection circuit 101 and to a delay circuit 102 as later explained. Since the digital moving picture signal S10 is processed as from this time from one macro-block MB to another, this signal S10 is termed input MB signal.

The motion vector detection circuit 101 calculates the motion vector MV on the macro-block basis from the digital moving picture signal S10. This motion vector detection is by pattern matching between a reference frame and the current macro-block MB. That is, a sum Ef of absolute values of differences between a signal A[i,j] of the current macro-block signal MB and a signal F[i,j] of a macro-block referred by an optional motion vector:

$$Ef = \Sigma |A[i,j]-F[i,j]| (i=0 \text{ to } 15, j=0 \text{ to } 15) \tag{14}$$

The motion vector detection circuit 101 outputs a motion vector which gives the smallest value of Ef as a motion vector signal MV.

The input MB signal S10 and its macro-block based motion vector MV are sent to a relative coding difficulty calculating circuit 107 where the relative coding difficulty dft_mb of the input MB signal S10 is calculated. The relative coding difficulty is a parameter specifying the MB-based volume of the input MB signal S10. An illustrative structure of the relative coding difficulty calculating circuit 107 will be explained subsequently. The relative coding difficulty dft_mb is sent to a bit rate controller 104.

The input MB signal S10 and its macro-block based motion vector MV are sent to a characteristic value calculating circuit 103 where a weighting coefficient weight_mb of the input MB signal taking into account the visual characteristics are calculated. The weighting coefficient weight_mb is a parameter representing the degree of visibility of deterioration due to coding. The characteristic value calculating circuit 103 will be explained subsequently. The weighting coefficient weight_mb is sent to the bit rate controller 104.

On the other hand, the input MB signal and its macro-block based motion vector MV are delayed by the delay circuit 102, until the quantization scale mQ of the macro-block MB is outputted by the bit rate controller 104, before being supplied to a motion vector coding circuit 105. The digital motion vector signal delayed by the delay circuit 102 is termed hereinafter an input MB signal S11 for distinction from the input MB signal. The input MB signal S11 outputted by the delay circuit 102 is encoded by the moving picture encoding circuit 105 to generate a coded bitstream which is outputted at an output terminal 106. The volume of the encoded generated bits bit_mb, calculated by the moving picture encoding circuit 105, is sent to the bit rate controller 104 which will be explained in detail subsequently.

Figure 6:
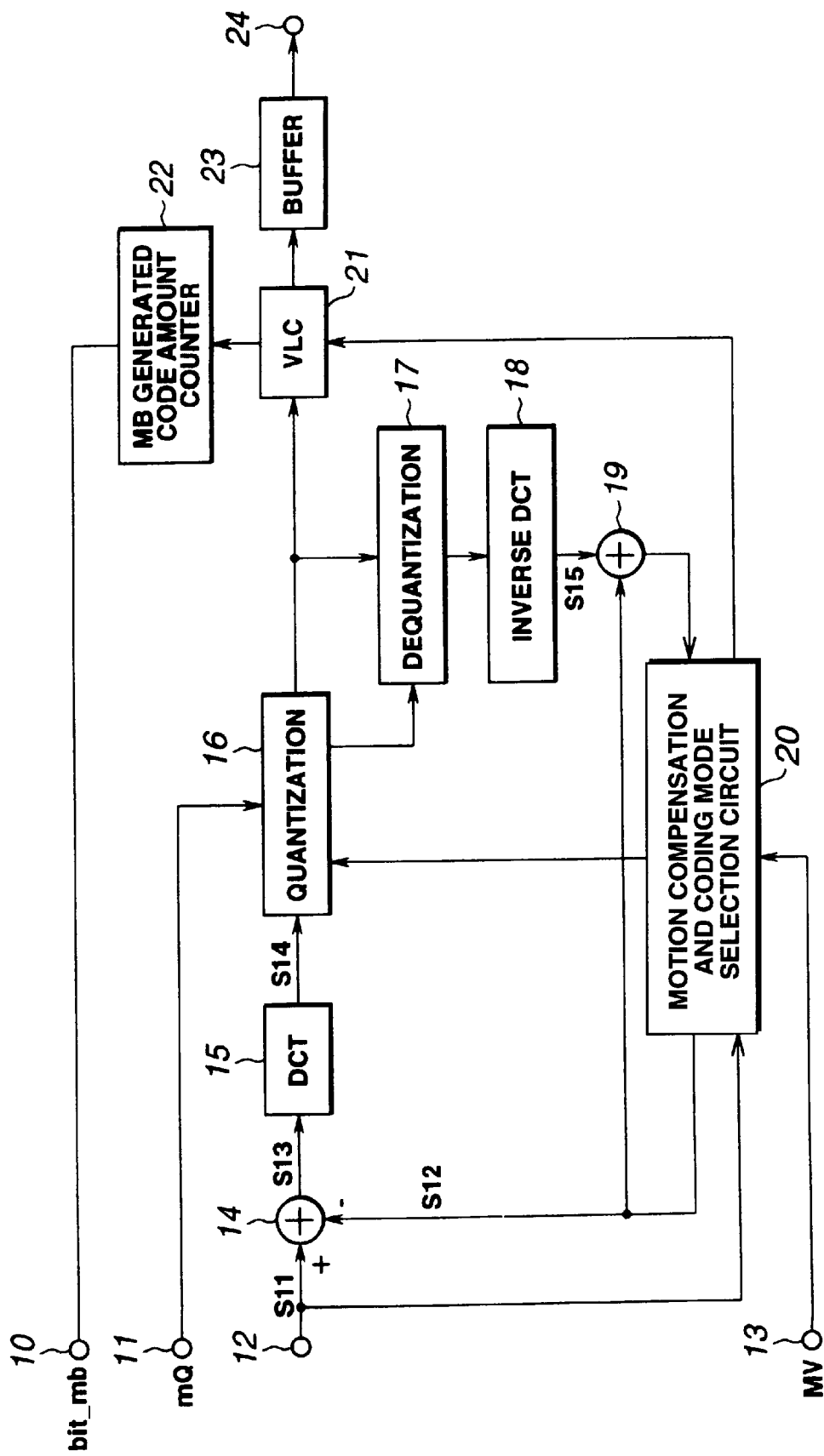
FIG. 6 is a block circuit diagram showing an illustrative structure of a moving picture encoding circuit.

FIG. 6 shows an illustrative structure of a moving picture encoding circuit 105. This moving picture encoding circuit 105 executes hybrid encoding which is a combination of motion-compensated inter-frame prediction and DCT.

In FIG. 6, the input MB signal S11 from the delay circuit 102 of FIG. 1 is supplied to a terminal 12, whilst the macro-block based motion vector MV, delayed by the delay circuit 102, is supplied to a terminal 13. The input MB signal S11 and the associated motion vector MV are entered to a motion compensation circuit 20.

The motion compensation circuit 20 includes a picture memory from which the macro-block based prediction picture signal MB, referred to hereinafter as prediction MB signal, is read out. The sum of absolute values of the macro-block based difference between the input MB signal and the prediction MB signal is compared to the sum of absolute values of the differences from the mean value of the input MB signal. If the former or the latter is found to be smaller, the inter-coding mode or the intra-coding mode is set, respectively. If the picture is an I-picture, all macro-blocks MB are set to the intra-coding mode. The motion compensation circuit 20 outputs the prediction MB signal as a signal S12, if the coding mode is the inter-coding mode, while outputting all-zero signals of the macro-block MB as a signal S12 if the coding mode is the intra-coding mode.

An arithmetic unit 14 adds the input MB signal S11 as an addition signal and the above signal S12 as a subtraction signal from one macro-block to another to find the difference between the input MB signal S11 and the signal S12 to output the resulting difference as a predicted remainder MB signal S13.

The predicted remainder MB signal S13 is then sent to a DCT circuit 15 which then performs the 8×8-pixel two-dimensional DCT on the predicted remainder MB signal S13 on the block basis to output the resulting DCT coefficients S14. These DCT coefficients S14 are sent to a quantization circuit 16.

The quantization circuit 16 then quantizes the DCT coefficients based on the quantization scale mQ supplied via terminal 11 from the bit rate controller 104 of FIG. 5 and the intra/inter prediction mode determined by the motion compensation circuit 20 in order to quantize the DCT coefficients as follows:

If the mode is the intra-coding mode,
DC coefficients $$i[0,0]=c[0,0]/8 \tag{15}$$

AC coefficients $$i[u,v]=16*c[u,v]//(mQ*m1[u,v]) \tag{16}$$

If the mode is the inter-coding mode, $$i[u,v]=16*c[u,v]/(mQ*m2[u,v]) \tag{17}$$

In the above equations, c[u,v] (u=0 to 7 and v=0 to 7) are input DCT coefficients and i[u,v] are the quantized DCT coefficients. Also, in the above equations, m1[u,v] denotes a quantization matrix for intra-coding and m2[u,v] denotes a quantization matrix for inter-coding. FIGS. 7A, 7B show examples of the quantization matrix m1[u,v] for intra-coding and the quantization matrix m2[u,v] for inter-coding, respectively. In the above equations, symbols // and / denote integer division for rounding to the nearest integer and an integer division with rounding off for approaching the result towards 0, respectively.

The quantized output signal of the quantization circuit 16 and the associated motion vector MV are sent to a variable-length encoding circuit (VLC) 21. The VLC 21 variable-length encodes the quantized output signal and the motion vector MV based on the MPEG syntax.

The signal obtained by this variable length coding is sent to a buffer memory 23. This buffer memory 23 smoothes variations in the volume of generated bits during a short time period from the VLC 21 to output a coded bitstream of the target bitrate. The coded bitstream outputted by the buffer memory 23 is outputted at a terminal 24 and thence supplied to the output terminal 106 of FIG. 5.

An output signal of the VLC 21 is also sent to a counter 22 which counts the volume of codes of the output signal of the VLC 21 to find the volume of generated codes corresponding to the input MB signal to transmit the generated code volume as the aforementioned volume of generated encoded bits bit_mb to a terminal 10. The volume of generated encoded bits bit_mb outputted by this terminal 10 is sent to the bit rate controller 104.

On the other hand, the quantized output signal and the quantization scale of the quantization circuit 16 are sent to a dequantization circuit 17 which then dequantizes the quantized output signal in association with the above-mentioned quantization scale. An output of the dequantization circuit 17 is supplied to an inverse DCT circuit 18 for inverse DCT and decoding to give prediction remainder MB signal which is entered to an arithmetic unit 10.

This arithmetic unit 19 is fed with the same signal as the aforementioned prediction MB signal S15 supplied to the arithmetic unit 14. The arithmetic unit 19 adds the prediction MB signal S12 to the prediction MB signal S15. This gives a locally decoded picture signal which is the same signal as the output picture on the receiver or decoder side.

Figure 2:
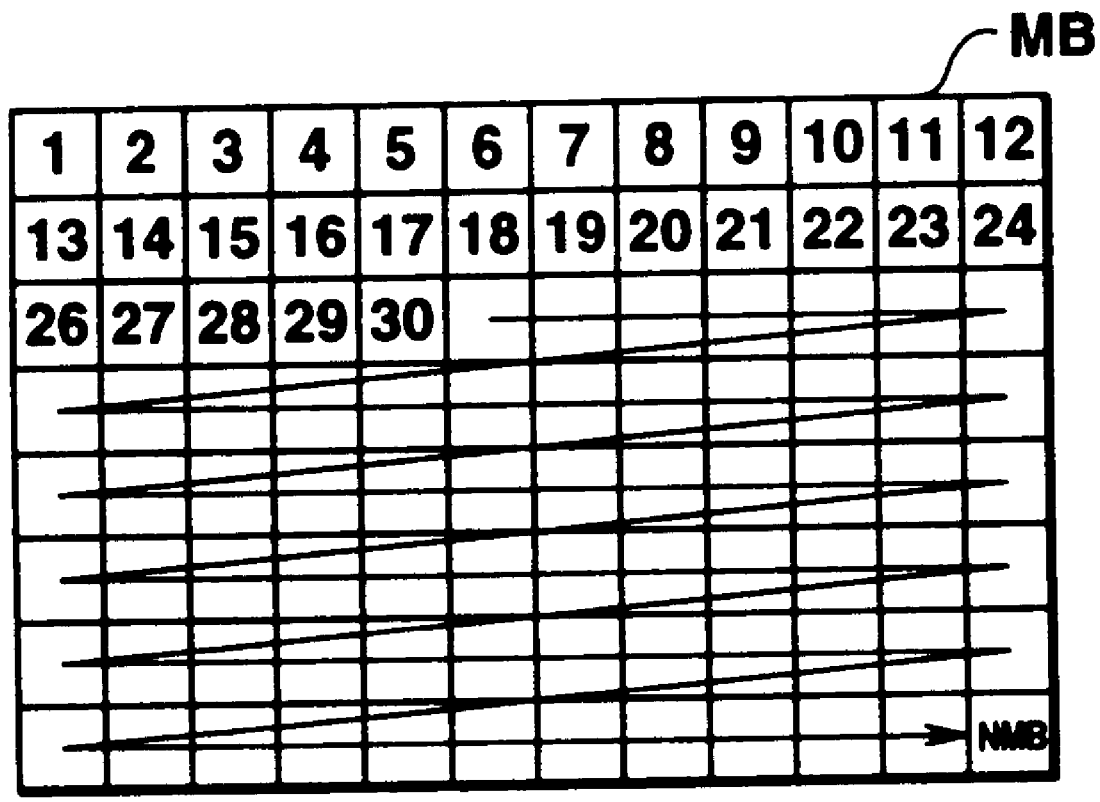
FIG. 2 illustrates the coding sequence of the macro-blocks MB in a picture.
Figure 3:
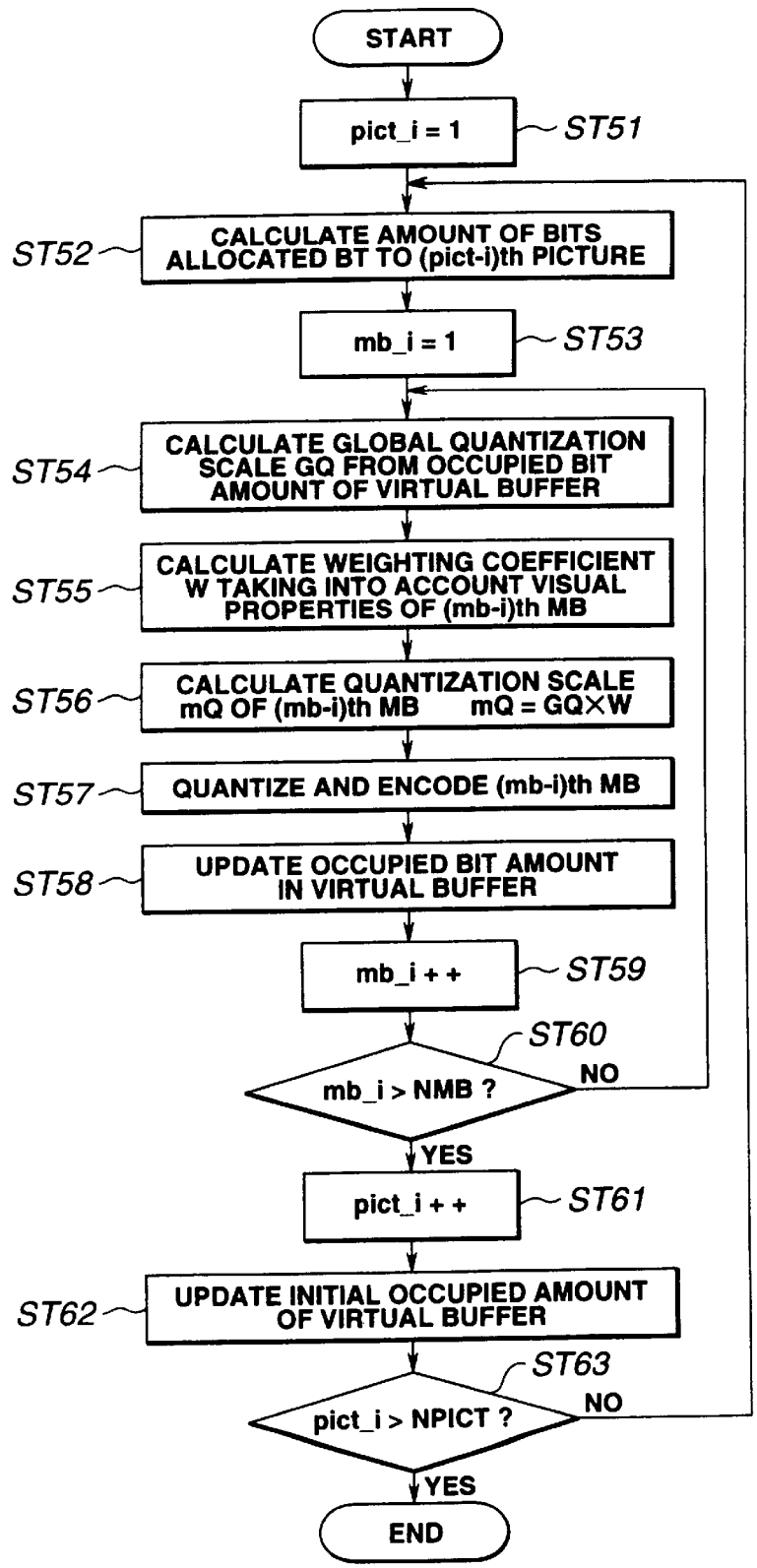
FIG. 3 is a flowchart showing the flow of calculations of the quantization scale of the macro-block MB by TM5 system rate control.
Figure 8:
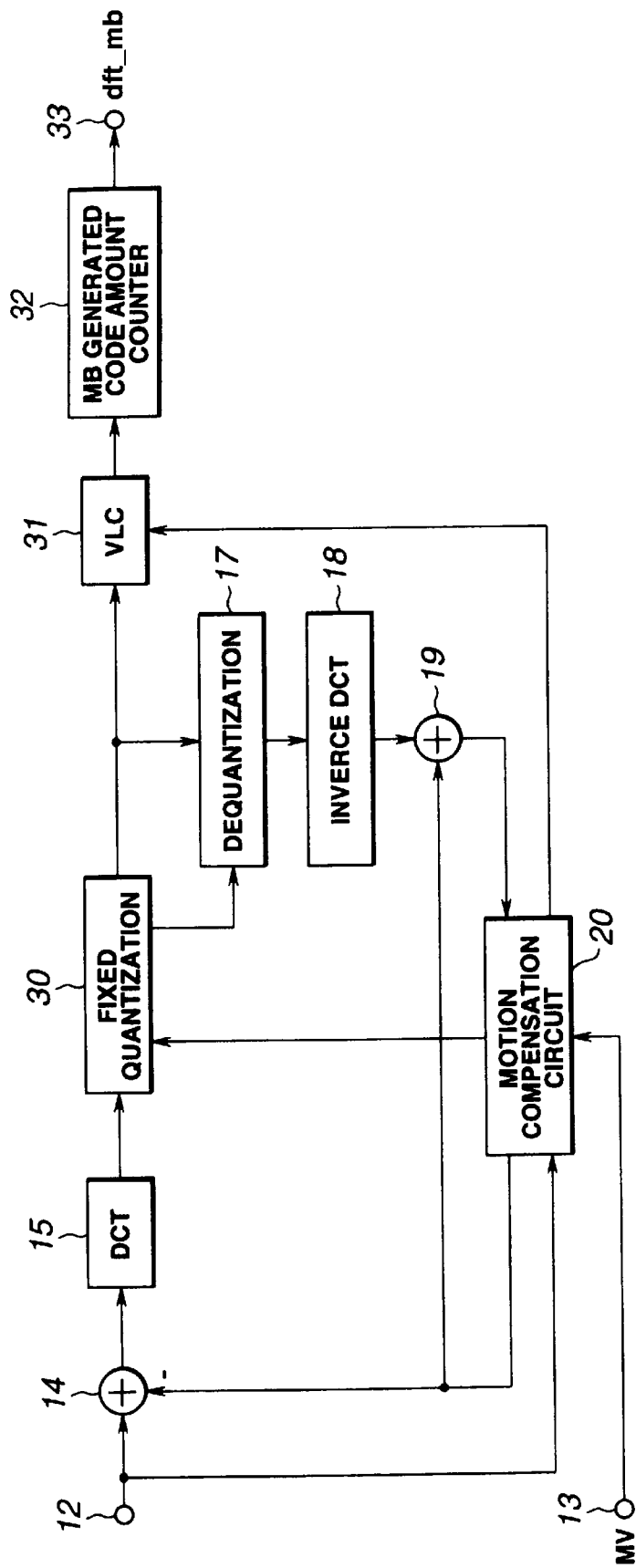
FIG. 8 is a block circuit diagram showing an illustrative structure of an relative coding difficulty calculating circuit.

FIG. 8 shows an illustrative structure of the relative coding difficulty calculating circuit 107 shown in FIG. 5. This relative coding difficulty calculating circuit 107 is basically the same as the moving picture encoding circuit explained with reference to FIG. 6, with the difference being that a fixed quantization scale is used in the quantization circuit 30 and the volume of bits occupied in the buffer is not supervised in connection with the volume of generated codes from the VLC 31. That is, the volume of generated bits from the VLC 31 is counted up by a counter 32 from one macro-block MB to another such that relative coding difference dft_mb is outputted at a terminal 33. In FIG. 8, parts or components similar to those of FIG. 2 are denoted by the same reference numerals and the corresponding description is omitted for simplicity.

Figure 9:
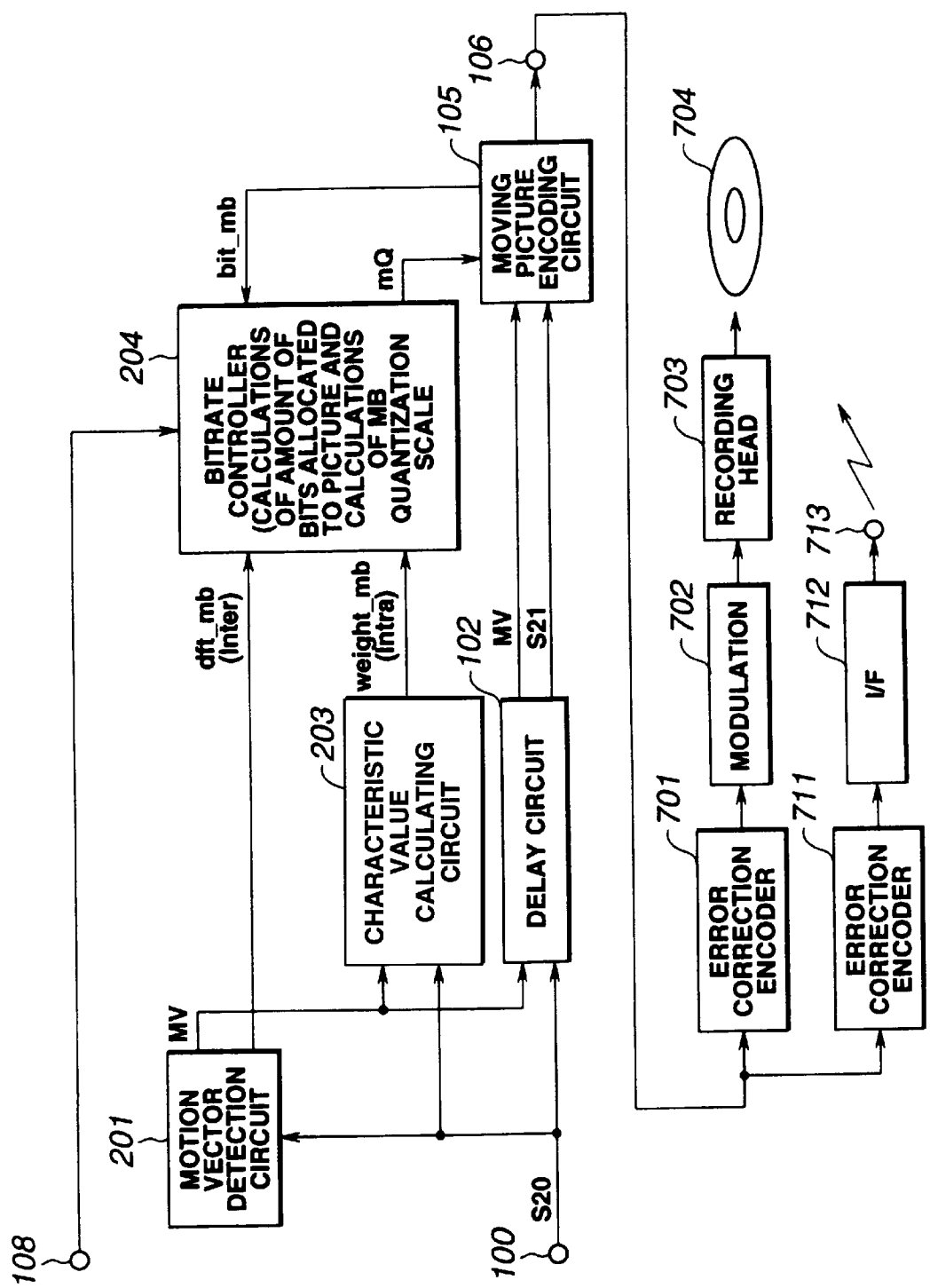
FIG. 9 is a block circuit diagram showing a second embodiment of a picture signal encoding device according to the present invention.

FIG. 9 shows a second embodiment of the picture signal encoding device of the present invention.

The present second embodiment of the picture signal encoding device differs from the above-described first embodiment of the picture signal encoding device as to the method of calculating the relative coding difficulty dft_mb of the macro-block MB. In FIG. 6, parts or components similar to those of FIG. 5 are denoted by the same reference numerals and the corresponding description is omitted for simplicity.

If, in this second embodiment of the picture signal encoding device of FIG. 9, the input digital moving picture signal (input MB signal) S20 is encoded as a P- or B-picture, the prediction remainder of the input MB signal S20 from the motion vector detection circuit 201, that is the sum Ef of the absolute values of the differences calculated by the above equation (14), is used as the macro-block based relative coding difficulty dft_mb. If the input MB signal S20 is encoded as an I-picture, the sum of absolute values of the differences from the mean value of the input MB signal S20 calculated by a characteristic value calculating circuit 203 is used as the macro-block based relative coding difficulty dft_mb. It is also possible to use a variance of the input MB signal S20 as the relative coding difficulty dft_mb(intra) of the macro-block MB. The bit rate controller 204, supplied with the relative coding difficulty dft_mb(inter) or dft_mb (intra), will be explained in detail subsequently. The operation other than that described above is the same as that for the picture signals encoding device explained in connection with the first embodiment shown in FIG. 5. The digital moving picture signal delayed by the delay circuit 102 is indicated as S21 in FIG. 9.

The operations of the characteristic value calculating circuit 103 for the macro-block MB in the picture signal encoding device shown in FIG. 5 and the characteristic value calculating circuit 203 for the macro-block MB in the picture signal encoding device shown in FIG. 9 are next explained. These characteristic value calculating circuits calculate, as characteristic values of the input MB signal (S10 or S20), the flatness F, lightness L, redness (red level) R, the amount (magnitude) of motion M and the position of the macro-block MB in the picture.

As the flatness F, the variance values of the luminance signals of the macro-block MB, for example, are calculated.

As the lightness L, a mean value of the luminance signals of the macro-block MB, for example, is calculated.

As the red level (R), the size of the red area in the macro-block MB is calculated. For example, the pixel value Cr[i,j] of the Cr block of the macro-block MB is compared to the pixel value Cb[i,j] of the Circuit board block to calculate the red level R counted by the if-condition of equation (18):

$$if((Cr[i,j]>TH1) \&\& (Cr[i,j]<TH2))R++; \quad (i=0 \text{ to } 7, j=0 \text{ to } 7) \quad (18)$$

wherein TH1 and TH2 denote constant threshold values. In the above equation (18), described using the so-called C++ language, symbols > and < are relative operators for judging relative magnitude of data, symbols ++ denotes increment operators, R++; means incrementing R by 1 and symbols && denotes a logical operator specifying a logical product.

As the motion value M, the magnitude of the motion vector of the macro-block MB is calculated. The weighting coefficients p are found by the position of the macro-block MB in a picture.

The above-mentioned characteristic value calculating circuit 103 or 203 finds coefficients $\alpha i$, $\beta i$, $\gamma i$, $\delta i$ and $\epsilon i$, mapping characteristics of the functions f1 to f5 onto weighting coefficients mb_weight[i] specifying the relative visual perceptibility of deterioration in picture quality to find respective weighting coefficients mb_weight[i] by a product of these coefficients:

$$\alpha i = f1(Fi) \quad (19)$$
$$\beta i = f2(Li) \quad (20)$$
$$\gamma i = f3(Ri) \quad (21)$$
$$\theta i = f4(Mi) \quad (22)$$
$$\epsilon i = f5(Pi) \quad (23)$$
$$mb\_weight[i] = \alpha i \times \beta i \times \gamma i \times \theta i \times \epsilon i \quad (24)$$

where Fi, Li, Ri, Mi and Pi denote flatness, lightness, red level, amount of motion and weighting coefficient of the positions of the macro-block MB, respectively.

Specified examples of the characteristics of the functions f1 to f5 are explained with reference to FIGS. 10 to 14.

Figure 10:
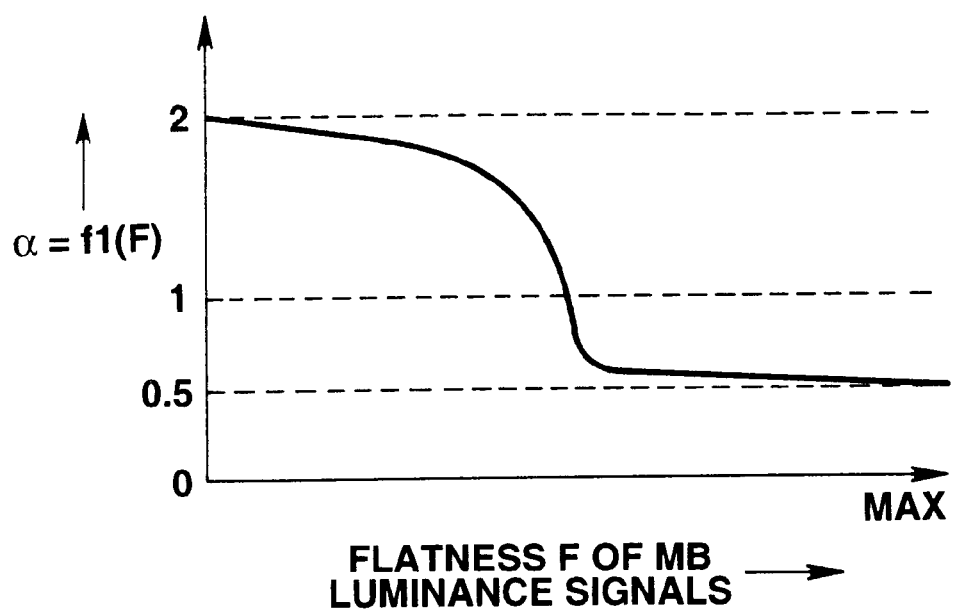
FIG. 10 is a graph for illustrating a function f1 between coefficients $\alpha$ and flatness F of luminance signals of the macro-block MB.

FIG. 10 shows characteristics of a function f1 describing the relation between the flatness (variance) of luminance signals of the macro-block MB and the function f1 of the coefficients $\alpha$. In FIG. 10, the abscissa denotes F with 0 denoting complete flatness and MAX denoting a most random picture pattern. In general, the human eye can recognize the encoding noise in the flat portion of a picture pattern, while it can hardly recognize deterioration in the random pattern portion of the picture. Based on this feature, the coefficient $\alpha$ is increased for lower flatness F and decreased towards higher flatness F.

Figure 11:
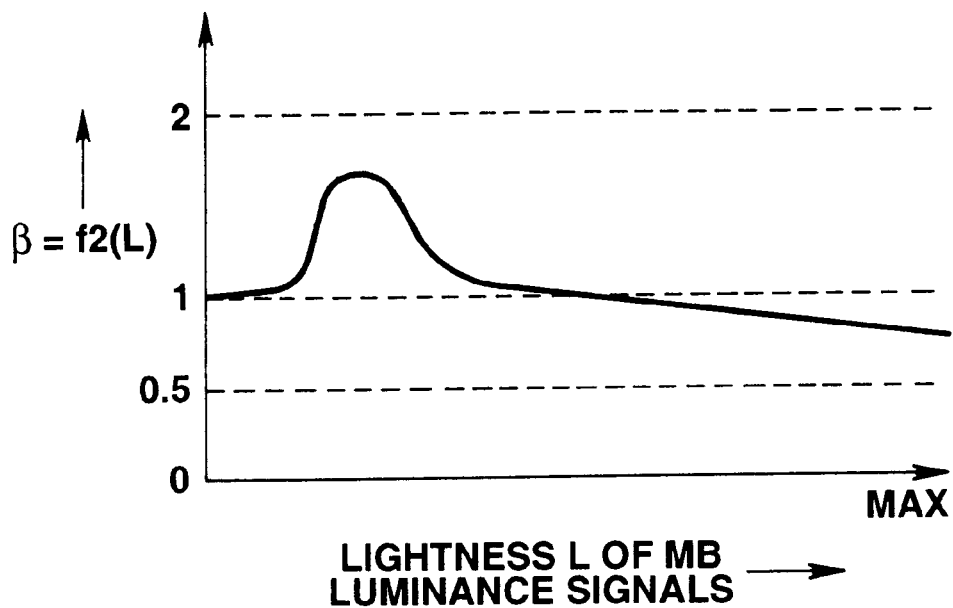
FIG. 11 is a graph for illustrating a function f2 between coefficients $\beta$ and lightness L (mean value) of luminance signals of the macro-block MB.

FIG. 11 shows characteristics of a function f2 specifying the coefficient $\beta$ against lightness (mean value) L of luminance signals of the macro-block MB. The lightness L on the abscissa of FIG. 11 denotes that 0 and MAX stand for black and the lightest value, respectively. In general, the human eye can easily recognize the encoding noise. In a dark picture for darkness beyond a certain level, however, the encoding noise can hardly be perceived because of excessive darkness. Based on this feature, the coefficient $\beta$ is set to 1 in the vicinity of lightness L=0. The coefficient $\beta$ is set to have a peak value at the level of lightness L which most readily permits the deterioration to be perceived, with the coefficient $\beta$ being gradually decreased for larger values of the lightness L.

Figure 12:
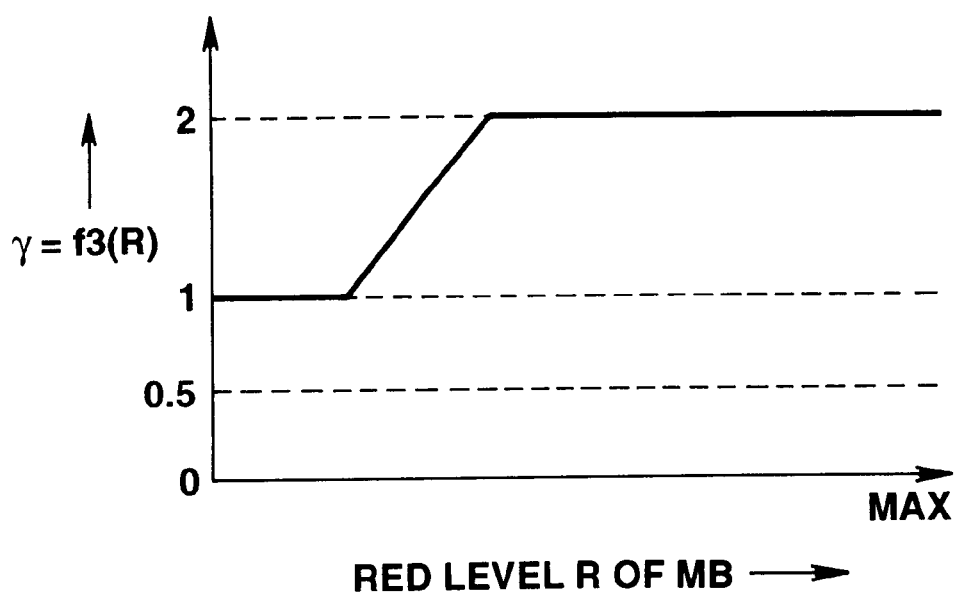
FIG. 12 is a graph for illustrating a function f3 between coefficients $\gamma$ and redness R of the macro-block MB.

FIG. 12 shows characteristics of the relation between the red level R of the macro-block MB and a function f3 of the coefficient $\gamma$. The red level R on the abscissa of FIG. 12 equal to 0 and MAX denote that there is no red area and that the entire area of the macro-block MB is of red color, respectively. In general, deterioration in red color is readily perceptible to the human eye. Based on this feature, the coefficients $\gamma$ is increased for the measure of a red area larger than a pre-set value.

Figure 13:
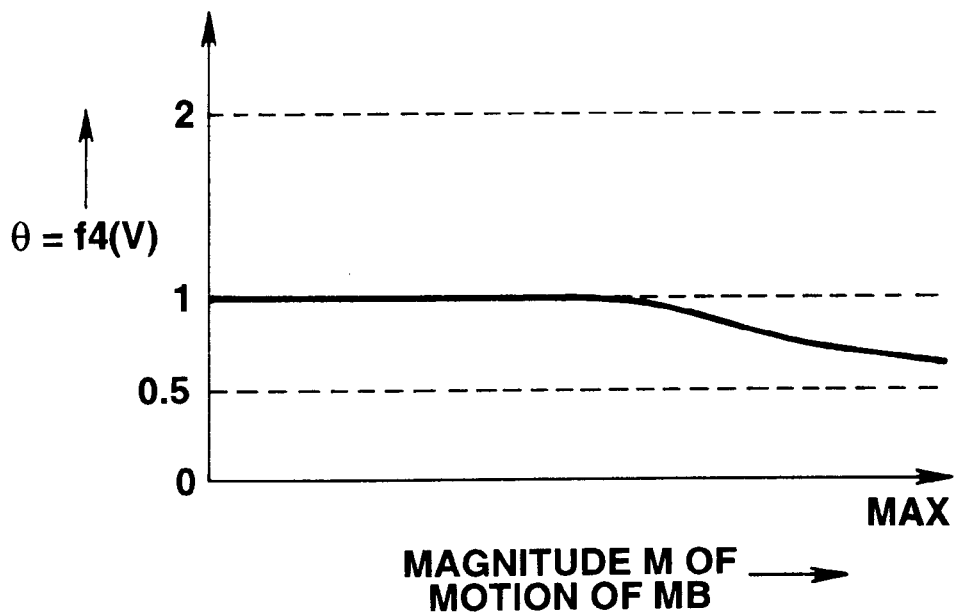
FIG. 13 is a graph for illustrating a function f4 between coefficients $\theta$ and the amount of motion M of the macro-block MB.

FIG. 13 shows characteristics of the relation between the amount of the motion M of the macro-block MB and a function f4 of the coefficient $\theta$. The amounts of motion M on the abscissa of FIG. 13 equal to 0 and MAX denote a still picture and a picture showing maximum motion (fastest motion), respectively. In general, the human eye cannot follow the motion if a picture has fast motion, such that it can hardly recognize picture deterioration. Based on this feature, the coefficient $\theta$ is a small value not larger than 1 for the larger value of the amount of motion M.

Figure 14:
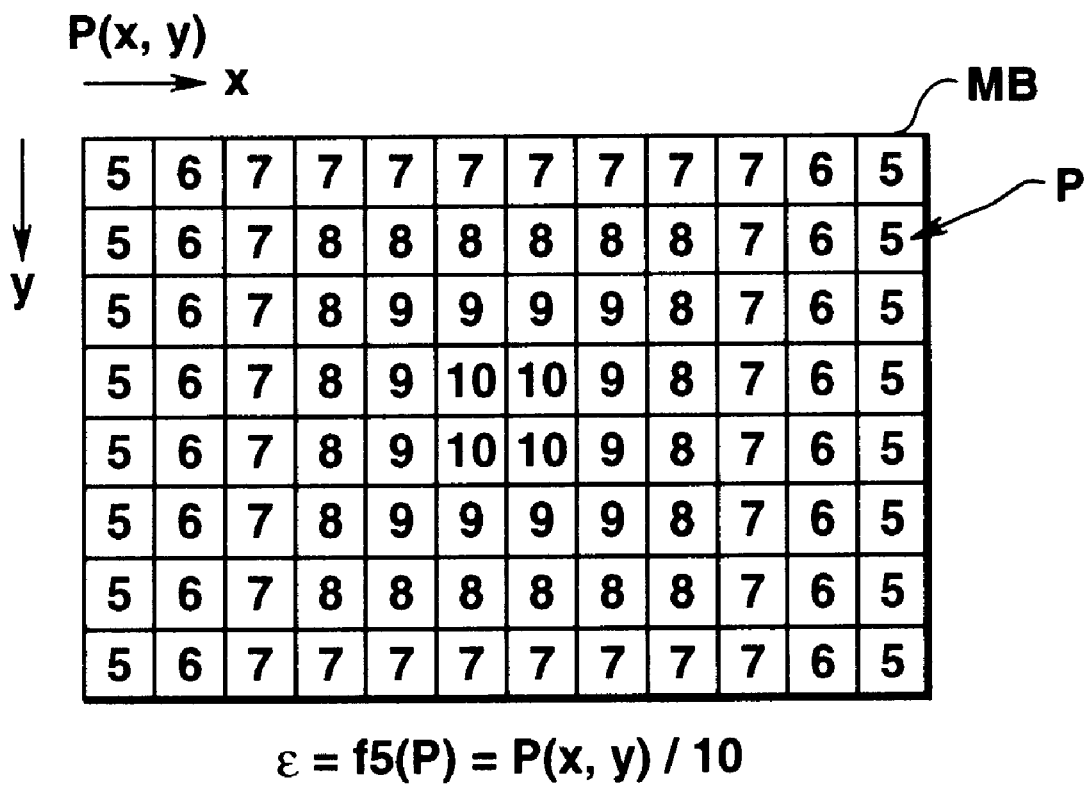
FIG. 14 is a graph for illustrating a function f5 between coefficients $\epsilon$ and a position P of the macro-block MB in a picture.

FIG. 14 shows characteristics between weighting coefficients P in terms of numerical values specifying the degree of visibility of deterioration and the position of the macro-block MB in the picture. In general, the human being tends to view the center of a picture, while deterioration in picture quality at picture edge portions is visible to a lesser extent. Based on this feature, the weighting coefficients are decreased radially from the picture center. The coefficients $\epsilon$ are calculated from the following equation (26):

$$\epsilon = P[x,y]/10 \qquad (25)$$

The characteristic value calculating circuit 103 or 203 multiplies the coefficients $\alpha$, $\beta$, $\gamma$, $\theta$ and $\epsilon$ thus found by one another to find weighting coefficients weight_mb of the macro-block MB. As for the ith macro-block MB, the coefficients $\alpha i$, $\beta i$, $\gamma i$, $\theta i$ and $\epsilon i$ are found and multiplied by one another as shown in the equation (24) to give the weighting coefficients weight_mb of the ith macro-block MB. For calculating these weighting coefficients weight_mb, one or more of the coefficients $\alpha i$, $\beta i$, $\gamma i$, $\theta i$ and $\epsilon i$ may also be used instead of using all of these coefficients.

Figure 15:
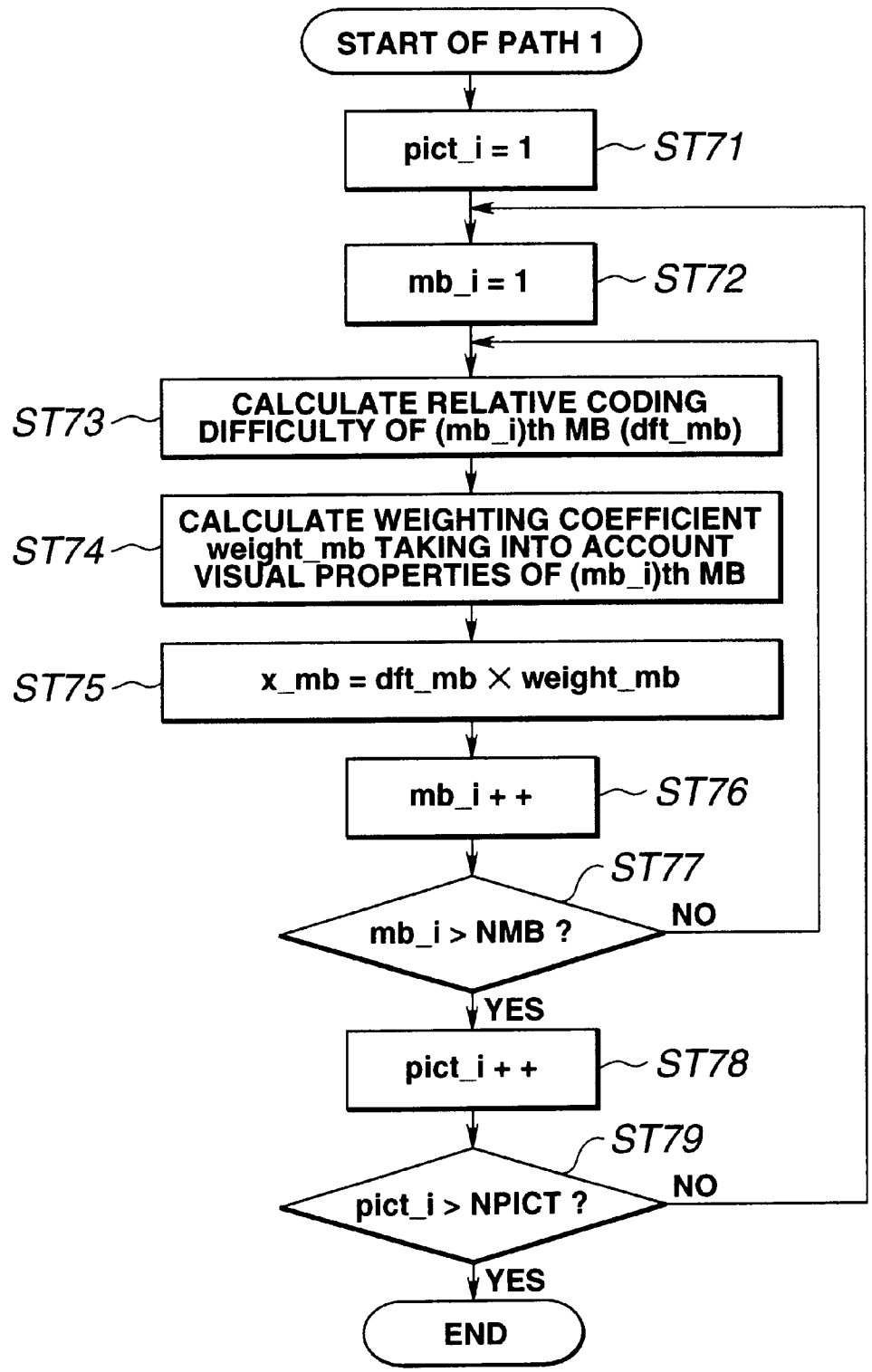
FIG. 15 is a flowchart showing the flow of calculations for the first path for calculating the first path for calculating the quantization scale of the macro-block MB by bit rate control embodying the invention.
Figure 16:
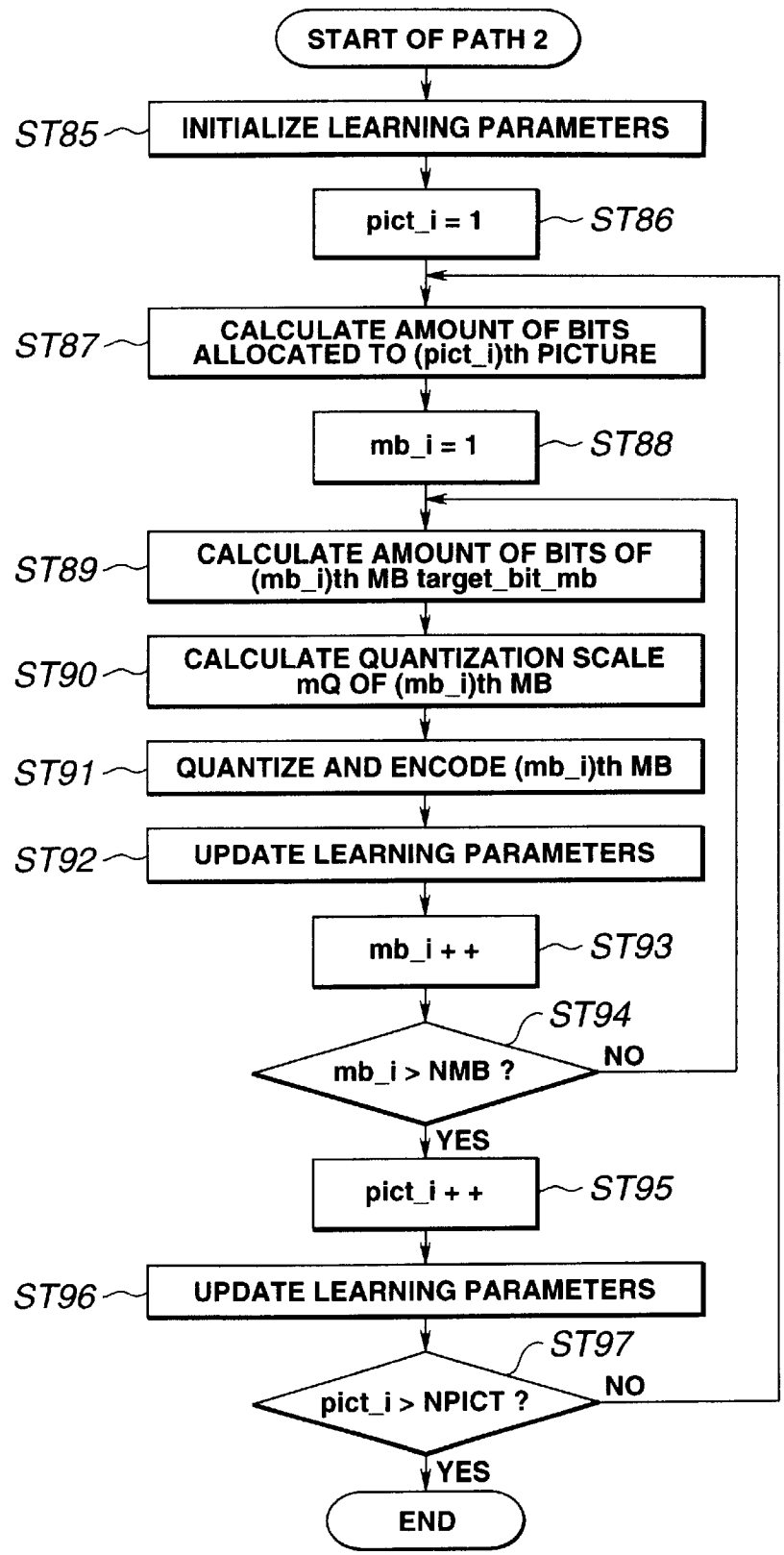
FIG. 16 is a flowchart for illustrating the flow of calculations for the second path in calculating the quantization scale of the macro-block MB in the bit rate control embodying the invention.

The processing flow for calculating the relative coding difficulty dft_mb and the weighting coefficients weight_mb of the macro-block MB and determining the quantization scale of the macro-block MB by the bit rate controller 104 or 204 is hereinafter explained. The bit rate control carried out by the bit rate controller 104 or 204 is of two paths. FIGS. 15 and 16 show the operation of the first and second paths, respectively.

The operation of the first path shown in FIG. 15 is aimed at searching the complexity degree x_mb of the macro-block MB of the input moving picture signal.

At step ST71 of FIG. 15, the variable pict_i is set to 1 for designating the first picture in the sequence as being a picture processed for the first path. This designates the initial picture among the pictures of the sequence.

After this step ST71, the variable pict_i is incremented each time processing goes through the steps ST72 to ST79 for processing each picture in the sequence by the first-path processing. The processing from this step ST72 to step ST79 is repeated until the first-path processing of each macro-block of all pictures in the sequence comes to a close.

In the first step ST72 of the processing from step ST72 to step ST79, the above variable mb_i is set to 1 as the macro-block MB processed by the first path processing in the pct_ith picture for designating the first macro-block MB in the picture.

After this step ST72, the above variable mb_1 is incremented each time the processing goes through the steps ST73 to ST77 for processing the macro-blocks MB in the picture for all macro-blocks MB in the picture. This processing from step ST73 up to step ST77 is repeated until the first-path processing for all macro-blocks in the picture comes to a close.

As the processing from step ST73 up to step ST77, the relative coding difficulty dft_mb of the mb_ith macro-block is calculated as described above.

At the next step ST74, the weighting coefficients weight_mb, specifying the relative visibility of picture quality deterioration taking into account the visual characteristics of the mb_ith macro-block MB, are calculated as explained previously.

At the next step ST75, the relative complexity degree x_mb of the mb_ith macro-block MB is calculated by multiplying the relative coding difficulty dft_mb of the macro-block with the weighting coefficients weight_mb, as shown by the equation (26):

$$xmb[mb\_i] = dft\_mb\_i] * weight[mb\_i] \qquad (26)$$

At the next step ST76, the address of the macro-block MB is advanced by one. That is, the above variable mb_i is incremented by one.

At the step ST77, it is judged whether or not the processing of the last macro-block MB of the pict_ith picture has come to a close. If it is judged at this step ST77 that the processing has not come to a close, processing reverts to step ST73. If it is judged at this step ST77 that the processing has come to a close, processing transfers to processing of the next picture.

At step ST79, it is judged whether or not processing of the last picture of the sequence (with the number of pictures being NPCT) has come to a close. If it is judged at this step ST79 that the processing has not come to a close, processing reverts to step ST72. If it is judged at this step ST79 that the processing has come to a close, processing transfers to step ST80 to terminate the first path processing.

The second path processing shown in FIG. 16 is aimed at calculating the quantization scale mQ of the macro-block MB of the input moving picture signal.

At first step ST85 of FIG. 16, the learning parameter KQ is initialized. The initial value KQ[1] of the learning parameter KQ is pertinent to the calculating conditions of the relative coding difficulty of the macro-block. The learning parameter KQ is updated at the subsequent step ST92.

At the next step ST86, the above variable pict_i is incremented for specifying the first picture among the pictures in the sequence as a picture processed by the second path processing.

After this step ST86, the above variable pict_1 is incremented each time the processing goes through the steps ST87 to ST97 for processing the macro-blocks MB in the picture for all macro-blocks MB in the picture. This processing from step ST87 up to step ST97 is repeated until the second-path processing for all macro-blocks in the picture comes to a close.

At the first step ST87 in the processing from the step ST87 up to step ST97, the volume of allocated bits BT of the pict_ith picture is calculated. That is, in the bit rate controller 104 or 204, the volume of the allocated bits of the GOP supplied from the terminal 108 is allocated by proportional distribution depending on the relative coding difficulty of each picture. The relative encoding difficulty of the pict_ith picture is calculated from the sum total of the relative encoding difficulty of the pict_ith of the macro-blocks of the picture.

At the first step ST88 in the processing from the next step ST88 to step ST94, the variable mb_i is set to 1 from designating the first macro-block MB in the picture as being a macro-block MB processed by the second path processing in the pict_ith picture.

After this step ST88, the above variable mb_i is incremented by one in each step for processing each macro-block MB in the picture with the second-path processing. This processing from step ST89 up to step ST94 is repeated until the second-path processing for all macro-blocks in the picture comes to a close.

By way of the processing from step ST89 up to step ST94, the volume of allocated bits target_bit_mb of the mb_ith macro-block is calculated first at step ST89 by the following equation (27):

$$target\_bit\_mb[mb\_i]=XA*x\_mb[mb\_i] \quad (27)$$

In the equation (27), XA is a constant parameter in the pict_ith picture calculated by the following equation (28)

$$XA=BT/sum\_x\_mb \quad (28)$$

In the above equation (28), the variable sum_x_mb is the sum total of the relative complexity degree x_mb of the macro-blocks in the pict_ith picture calculated by the first-path processing. This variable sum_x_mb is found by the following equation (29):

$$sum\_x\_mb=\Sigma x\_[mb\_i](mb\_i=1 \text{ to } NMB) \quad (29)$$

At the next step ST90, the quantization scale mQ of the mb_ith macro-block MB is calculated by the following equation (30):

$$mQ[mb\_i]=KQ[mb\_i]/(KQ*XA*weight\_mb[mb\_i]) \quad (30)$$

In the above equation, KR is a coefficient pertinent to the target bit rate, while KQ[mb_i] is a learning parameter which is updated at the subsequently step ST92 from one macro-block MB to another.

At the next step ST91, the DCT coefficients of the mb_ith macro-block MB are quantized and encoded. This enables calculations of the actual volume of generated bits bit_mb [mb_i] in the mb_ith macro-block MB.

At the next step ST92, the learning parameter KQ is updated. As learning parameters, KQ_I, KQ_P and KQ_B are provided for the I-, P- and B-pictures, respectively. These are updated by the equations (31), (32) and (33), respectively:

$$KQ\_I[mb\_i+1]=KQ\_I[1]+BG[mb\_1]\cdot BTMB[mb\_i] \quad (31)$$

$$KQ\_P[mb\_i+1]=KQ\_P[1]+BG[mb\_1]\cdot BTMB[mb\_i] \quad (32)$$

$$KQ\_B[mb\_i+1]=KQ\_B[1]+BG[mb\_1]\cdot BTMB[mb\_i] \quad (33)$$

In the above equations, KQ_I[1], KQ_P[1] and KQ_B[1] are initial values for the first macro-blocks MB of the I-, P- and B-pictures, respectively. On the other hand, BG[mb_i] is a sum total of the volumes of generated encoding bits bit_mb as from the first macro-block MB up to the mb_its macro-block MB of a picture, as indicated in the following equation (34):

$$BG[mb\_i]=\Sigma bit\_mb[mb\_i] \; (I=1 \text{ to } mb\_i) \quad (34)$$

whereas BTMB[mb_i] is a sum total of the volumes of allocated bits target_bit_mb as from the first macro-block MB up to the mb_ith macro-block MB of a picture, as indicated in the following equation (35)

$$BTMB[mb\_i]=\Sigma target\_bit\_mb[i] \; (I=1 \text{ to } mb\_i)$$

At the next step ST93, the address of the macro-block MB is advanced by one, that is, the above variable mb_1 is incremented by one.

At step ST94, it is judged whether or not processing of the last macro-block of the pict_ith picture has come to a close. If it is found at step ST94 that the processing has not come to a close, processing reverts to step ST89 and, if otherwise, processing transfers to step ST95 to increment the coefficient pict_i by one to transfer to processing of the next picture.

Then, at step ST96, averaged values of the learning parameters KQ_I, KP_P and KQ_B of the picture on encoding the I-, P- or B-pictures are substituted for initial values KQ_I[1], KQ_P[1] and KQ_B[1] for the next pictures of the same picture types, respectively. This substitution is by the following equations (36), (37) and (38):

$$KQ\_I(1)=(\Sigma KQ\_I[i])/NMB \; (I=2 \text{ to } mb\_i+1) \quad (36)$$

$$KQ\_P(1)=(\Sigma KQ\_P(i))/NMB \; (I=2 \text{ to } mb\_i+1) \quad (37)$$

$$KQ\_B(1)=(\Sigma KQ\_B(i))/NMB \; (I=2 \text{ to } mb\_i+1) \quad (38)$$

At the next step ST97, it is judged whether or not processing of the last picture of the sequence (with the number of pictures equal to NPICT) has come to a close. If it is found at step ST97 that the processing has not come to a close, processing reverts to step ST87 and, if otherwise, processing transfers to step ST98 to terminate the processing of the second-path bit rate control.

The amount of delay between the above-mentioned first and second paths is preferably not less than 1 GOP. For providing this time delay, the delay circuit 102 of FIG. 5 or the delay circuit 102 of FIG. 9 is used. If all pictures of the sequence are encoded as I-pictures, one-picture time suffices as the amount of delay between the first and second paths. On the other hand, if the number of the pictures in a sequence NPCT=1, a still picture is encoded as an I-picture, so that one picture suffices as the amount of delay between the first and second paths.

The encoded bitstream, obtained by encoding by the first and second embodiments of the picture signal encoding device, is recorded on a signal recording medium according to the present invention or transmitted over a transmission channel.

FIGS. 5 and 9 show examples of using an optical disc 704 as a signal recording medium for recording or transmission over a transmission channel.

In case of recording on the optical disc 704 in FIGS. 5 or 9, a data stream composed of an encoded bitstream outputted at the output terminal 106 and the information necessary for subsequent decoding, such as the quantization scale, is added to an error correction code by an error correction encoder (ECC encoder) 701 before being sent to a modulation circuit 702. The modulation circuit 702 processes the output of the error correction encoder 701 with pre-set modulation, such as so-called 8–14 (eight-to-fourteen modulation or EFM) or 8–16 modulation. By this modulation, the encoded 8-bit data are converted to 14 or 16 bit data for matching the digital signals to transmission characteristics for the optical disc 704. An output of the modulation circuit 702 is sent to a recording head 703 where it is recorded on the optical disc 704. Although the optical disc is used as a signal recording medium in the examples of FIGS. 5 and 9, the recording medium may also be a magnetic disc medium, such as a hard disc or a flexible disc, a tape-shaped recording medium, an IC card or a semiconductor memory, such as various memory devices. As an optical disc, a variety of optical discs, such as a phase transition type optical disc, an organic dye type optical disc, an optical disc for recording by UV laser light beam or an optical disc having a multi-layer recording film, may be used besides the disc for recording by physically forming pits, or a magneto-optical disc.

For transmission over a transmission channel, the above-mentioned data string is added to with an error correction code by an error correction encoder 711 and thence transmitted over the transmission channel via interfacing circuit 712 and a terminal 713. The transmission channel also includes electric waves or light in addition to the usual transmission cable.

For controlling the quantization scale for quantizing data of a macro-block MB in the above-described picture signal encoding method and apparatus of the present invention, a volume of bits allocated to a picture is received, calculations are then made of the relative complexity degree of all macro-blocks MB of the picture, and the quantization scale of the macro-blocks is calculated taking into account the volume of allocated bits necessary for each macro-block of the picture.

Thus, if the picture pattern is not uniform, as when the contents of the upper half and the lower half of a picture differ from each other such that the upper half picture is simple in picture pattern and the lower half picture is complex in picture pattern, the volume of bits necessary for the upper half picture and that necessary for the lower half picture can be adaptively allocated for calculating optimum quantization scale, thus enabling the picture to be encoded with higher picture quality than is possible with the conventional method.

Moreover, in calculating the complexity degree of all macro-blocks of a picture in advance as described above, the relative complexity degree for each macro-block MB of a picture is calculated from the relative coding difficulty and the weighting coefficients representing the variable visibility degree of picture quality deterioration. Specifically, the relative coding difficulty of the macro-block MB is calculated using the volume of bits generated on encoding the macro-block with a fixed quantization scale, the volume of prediction residual signal on detecting the motion vector of the macro-block MB or the difference residual volume from the mean value, of the macro-block MB, while the weighting coefficients representing the variable visibility degree of picture quality deterioration of the macro-block MB is calculated using at least one of lightness, red level, amount of motion and the position of the macro-block MB in the picture, in addition to flatness of the luminance signals. This enables encoding with less visibility of the deterioration in picture quality than is possible with the conventional method.

Also, in calculating the quantization scale of the macro-block MB taking into account the amount of allocated bits required for each macro-block MB of each picture, the volume of bits allocated to each macro-block is calculated so that the allocated bit volume will be proportionate to the variable complexity degree of each macro-block relative to the complexity degree of the entire picture. This enables extremely flexible designation of the weighting coefficients representing the variable visibility degree of picture contra-distinction from the conventional system, there is no necessity for normalization so that the expected value of the weighting coefficients for one picture will be equal to 1.

Figures 4A, 4B:
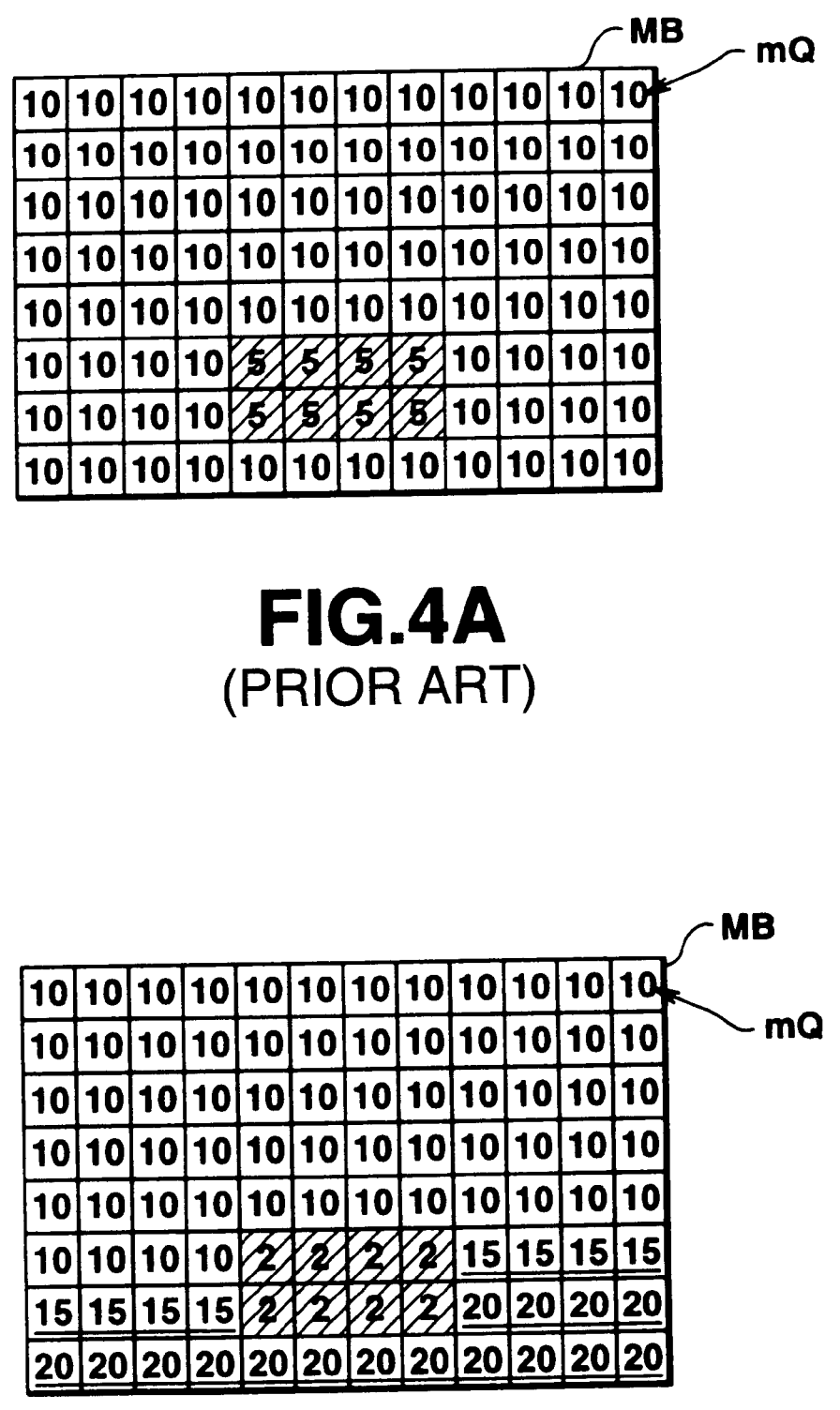
Figure 17:
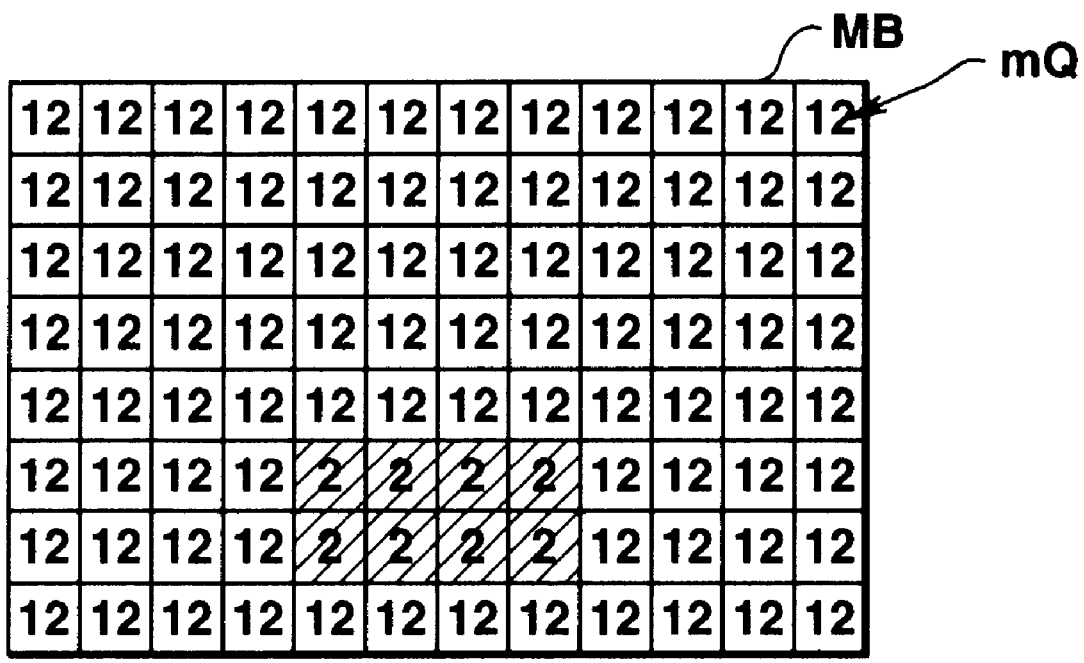
FIG. 17 illustrates typical results of calculations of the quantization scale of the macro-block MB of a picture in the picture signal encoding method of the present invention.

In addition, in the picture signal encoding method and apparatus embodying the invention, there is presented no such problem that, if the quantization scale mQ indicated by reference numerals entered in each macro-block MB in FIG. 17 has been calculated, and the weighting coefficients of macro-blocks shown shaded in FIG. 17 are increased with a view to reducing the quantization scale of the shaded macro-blocks MB, only the values of the quantization scale calculated for the macro-blocks MB downstream of the shaded macro-blocks are increased, as in the case shown in FIG. 4. This assures stabilized bit rate control as compared to that achieved with the above-mentioned prior-art method.

Thus, when encoding a picture corresponding to moving picture signals by dividing the picture into plural domains (MB) and encoding the picture from domain to domain, the picture quality can be rendered substantially uniform even if the picture pattern is not uniform by calculating the relative coding difficulty from one domain (MB) to another and the weighting coefficients representing the visibility degree of picture quality deterioration from one domain to another, calculating the complexity degree from the relative coding difficulty and the weighting coefficients from one domain to another and by calculating the quantization scale for encoding each domain using the allocated bit volumes for picture encoding and the above-mentioned complexity degree. In addition, the volume of bits occupying a virtual buffer can be stabilized to render picture quality deterioration less visible while assuring stabilized rate control.

What is claimed is:

1. A method for encoding picture signals in which moving picture signals are divided into plural macroblocks for encoding from one macroblock to another, comprising the steps of:

calculating relative coding difficulty from macroblock to macroblock;

calculating for each macroblock weighting coefficients representing a respective degree of visibility of picture quality deterioration;

calculating a complexity degree from macroblock to macroblock, based on the relative coding difficulty and the weighting coefficients; and calculating the quantization scale for encoding for the macroblocks based on the complexity degree and allocated bit volumes for encoding the macroblocks.

2. The method as claimed in claim 1 wherein the allocated bit volumes for encoding the macroblocks are calculated based on the complexity degree of the macroblocks relative to the complexity degree of the entire picture.

3. The method as claimed in claim 1 wherein said relative coding difficulty is calculated based on the volume of codes generated on encoding each macroblock with a fixed quantization scale.

4. The method as claimed in claim 1 wherein said relative coding difficulty is calculated based on the volume of predicted remainder signals at the time of detecting the motion vector of each macroblock.

5. The method as claimed in claim 1 wherein said relative coding difficulty is calculated based on the difference residual volume from a mean value of each macroblock.

6. The method as claimed in claim 1 wherein said weighting coefficients are calculated based on the lightness and flatness of luminance signals of said moving picture.

7. The method as claimed in claim 1 wherein said weighting coefficients are calculated based on the redness and flatness of luminance signals of said moving picture.

8. The method as claimed in claim 1 wherein said weighting coefficients are calculated based on the flatness and the amount of motion of luminance signals of said moving picture.

9. The method as claimed in claim 1 wherein said weighting coefficients are calculated based on the flatness of the luminance signals of the moving picture signals and the position of each macroblock in the picture.

10. The method as claimed in claim 1 wherein said weighting coefficients are calculated based on the combination of two or more of the lightness, redness, amount of motion and the position of each macroblock in the picture, in addition to the flatness of the luminance signals of the moving picture.

11. The method as claimed in claim 1 further comprising the step of:

encoding the moving picture signals based on said quantization scale for generating an encoded data string and transmitting the resulting encoded data string.

12. The method as claimed in claim 1 further comprising the step of:

encoding the moving picture signals based on said quantization scale for generating an encoded data string and recording the resulting encoded data string on a recording medium.

13. An apparatus for encoding picture signals in which a picture constituting moving picture signals is divided into plural macroblocks for encoding from one macroblock to another, comprising:

means for calculating relative coding difficulty from macroblock to macroblock;

means for calculating for each macroblock weighting coefficients representing a respective degree of visibility of picture quality deterioration; and means for calculating a complexity degree from macroblock to macroblock, based on the relative coding difficulty and the weighting coefficients, and calculating the quantization scale for encoding for the macroblocks based on the complexity degree and allocated bit volumes for encoding the domains.

14. The apparatus as claimed in claim 13 wherein said quantization scale calculating means calculates the allocated bit volumes for the macroblocks based on the complexity degree of the macroblocks relative to the complexity degree of the entire picture.

15. The apparatus as claimed in claim 13 wherein said relative coding difficulty calculating means calculate the relative coding difficulty based on the volume of codes generated on encoding each macroblock with a fixed quantization scale.

16. The apparatus as claimed in claim 13 wherein said relative coding difficulty calculating means calculates said relative coding difficulty based on the volume of predicted remainder signals at the time of detecting the motion vector of each macroblock.

17. The apparatus as claimed in claim 13 wherein said relative coding difficulty calculating means calculates said relative coding difficulty based on the difference residual volume from a mean value of each macroblock.

18. The apparatus as claimed in claim 13 wherein said weighting coefficient calculating means calculates the weighting coefficients based on the lightness and flatness of luminance signals of said moving picture.

19. The apparatus as claimed in claim 13 wherein said weighting coefficient calculating means calculates the weighting coefficients are calculated based on the redness and flatness of luminance signals of said moving picture.

20. The apparatus as claimed in claim 13 wherein said weighting coefficient calculating means calculates the weighting coefficients based on the flatness and the amount of motion luminance signals of said moving picture.

21. The apparatus as claimed in claim 13 wherein said weighting coefficient calculating means calculates the weighting coefficients based on the flatness of the luminance signals of the moving picture signals and the position of each macroblock in the picture.

22. The apparatus as claimed in claim 13 wherein said weighting coefficient calculating means calculates the weighting coefficients based on the combination of two or more of the lightness, redness, amount of motion and the position of each macroblock in the picture, in addition to the flatness of the luminance signals of the moving picture.

23. The apparatus as claimed in claim 13 further comprising:

transmission means for transmitting the resulting encoded data string.

24. The apparatus as claimed in claim 13 further comprising:

recording means for recording an encoded data string, obtained on encoding said moving picture signals based on the quantization scale, on a recording medium.

25. A recording medium having recorded thereon an encoded data string obtained by calculating, for each plural macroblocks into which is divided a picture making up moving picture signals, the relative coding difficulty and weighting coefficients representing the visibility degree of picture quality deterioration;

calculating the complexity degree from said relative coding difficulty and the weighting coefficients;

calculating the quantization scale of encoding for each macroblock based on the volume of allocated bits for encoding each macroblock and complexity degree; and encoding each macroblock based on said quantization scale.

26. The recording medium as claimed in claim 25 wherein the allocated bit volumes for encoding the macroblocks are calculated based on the complexity degree of the macroblocks relative to the complexity degree of the entire picture.

27. The recording medium as claimed in claim 25 wherein said relative coding difficulty is calculated based on the volume of codes generated on encoding each macroblock with a fixed quantization scale.

28. The recording medium as claimed in claim 25 wherein said relative coding difficulty is calculated based on the volume of predicted remainder signals at the time of detecting the motion vector of each macroblock.

29. The recording medium as claimed in claim 25 wherein said relative coding difficulty is calculated based on the difference residual volume from a mean value of each macroblock.

30. The recording medium as claimed in claim 25 wherein said weighting coefficients are calculated based on the lightness and flatness of luminance signals of said moving picture.

31. The recording medium as claimed in claim 25 wherein said weighting coefficients are calculated based on the redness and flatness of luminance signals of said moving picture.

32. The recording medium as claimed in claim 25 wherein said weighting coefficients are calculated based on the flatness and the amount of motion of luminance signals of said moving picture.

33. The recording medium as claimed in claim 25 wherein said weighting coefficients are calculated based on the flatness of the luminance signals of the moving picture signals and the position of each macroblock in the picture.

34. The recording medium as claimed in claim 25 wherein said weighting coefficients are calculated based on the combination of two or more of the lightness, redness, amount of motion and the position of each macroblock in the picture, in addition to the flatness of the luminance signals of the moving picture.

35. The recording medium as claimed in claim 25 further comprising the step of:
    encoding the moving picture signals based on said quantization scale for generating an encoded data string and transmitting the resulting encoded data string.

36. The recording medium as claimed in claim 25 further comprising the step of:
    encoding the moving picture signals based on said quantization scale for generating an encoded data string and recording the resulting encoded data string on a recording medium.

37. A transmission channel having transmitted thereover an encoded data string obtained by calculating, for each plural macroblocks into which is divided a picture taking up moving picture signals, the relative coding difficulty and weighting coefficients representing the visibility degree of picture quality deterioration;
    calculating the complexity degree from said relative coding difficulty and the weighting coefficients;
    calculating the quantization scale of encoding for each macroblock based on the volume of allocated bits for encoding each macroblock and complexity degree; and
    encoding each macroblock based on said quantization scale.

38. The transmission channel as claimed in claim 37 wherein the allocated bit volumes for encoding the macroblocks are calculated based on the complexity degree of the macroblocks relative to the complexity degree of the entire picture.

39. The transmission channel as claimed in claim 37 wherein said relative coding difficulty is calculated based on the volume of codes generated on encoding each macroblock with a fixed quantization scale.

40. The transmission channel as claimed in claim 37 wherein said relative coding difficulty is calculated based on the volume of predicted remainder signals at the time of detecting the motion vector of each macroblock.

41. The transmission channel as claimed in claim 37 wherein said relative coding difficulty is calculated based on the difference residual volume from a mean value of each macroblock.

42. The transmission channel as claimed in claim 37 wherein said weighting coefficients are calculated based on the lightness and flatness of luminance signals of said moving picture.

43. The transmission channel as claimed in claim 37 wherein said weighting coefficients are calculated based on the redness and flatness of luminance signals of said moving picture.

44. The transmission channel as claimed in claim 37 wherein said weighting coefficients are calculated based on the flatness and the amount of motion of luminance signals of said moving picture.

45. The transmission channel as claimed in claim 37 wherein said weighting coefficients are calculated based on the flatness of the luminance signals of the moving picture signals and the position of each macroblock in the picture.

46. The transmission channel as claimed in claim 37 wherein said weighting coefficients are calculated based on the combination of two or more of the lightness, redness, amount of motion and the position of each macroblock in the picture, in addition to the flatness of the luminance signals of the moving picture.

47. The transmission channel as claimed in claim 37 further comprising the step of:
    encoding the moving picture signals based on said quantization scale for generating an encoded data string and transmitting the resulting encoded data string.

48. The transmission channel as claimed in claim 37 further comprising the step of:
    encoding the moving picture signals based on said quantization scale for generating an encoded data string and recording the resulting encoded data string on a recording medium.

49. The transmission channel as claimed in claim 37, wherein the transmission channel is electric waves.

50. The transmission channel as claimed in claim 37, wherein the transmission channel is light.

51. The transmission channel as claimed in claim 37, wherein the transmission channel is a transmission cable.

* * * * *